US012512032B2

(12) United States Patent
Lakshminarayanan et al.

(10) Patent No.: US 12,512,032 B2
(45) Date of Patent: Dec. 30, 2025

(54) SYSTEM, METHOD, AND APPARATUS FOR PULSE-WIDTH MODULATION SEQUENCE

(71) Applicant: Texas Instruments Incorporated, Dallas, TX (US)

(72) Inventors: Aravind Lakshminarayanan, Frisco, TX (US); Natalia Garcia, Carrollton, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 492 days.

(21) Appl. No.: 17/245,974

(22) Filed: Apr. 30, 2021

(65) Prior Publication Data

US 2022/0351664 A1 Nov. 3, 2022

(51) Int. Cl.
*G09G 3/20* (2006.01)

(52) U.S. Cl.
CPC ......... *G09G 3/2014* (2013.01); *G09G 3/2022* (2013.01); *G09G 2310/0235* (2013.01)

(58) Field of Classification Search
CPC .... G09G 3/2014; G09G 3/2022; G09G 3/001; G09G 3/346; G09G 2310/0235; G09G 2360/121
See application file for complete search history.

(56) References Cited

U.S. PATENT DOCUMENTS

| | | | | |
|---|---|---|---|---|
| 2005/0012755 A1* | 1/2005 | Dresevic | G06F 1/1607 | 345/581 |
| 2005/0184938 A1* | 8/2005 | Hewlett | G09G 3/2037 | 345/84 |
| 2006/0044291 A1* | 3/2006 | Willis | G09G 3/3648 | 345/204 |
| 2006/0066540 A1* | 3/2006 | Hewlett | G09G 3/3413 | 345/84 |
| 2006/0082601 A1* | 4/2006 | Willis | G09G 3/346 | 348/E9.027 |
| 2008/0246706 A1* | 10/2008 | Russell | G09G 3/346 | 345/84 |
| 2009/0128571 A1* | 5/2009 | Smith | G09G 3/3216 | 345/519 |
| 2012/0162293 A1* | 6/2012 | Hudson | G09G 3/2014 | 345/88 |
| 2013/0242534 A1* | 9/2013 | Pettitt | G02B 27/141 | 362/84 |
| 2014/0368527 A1* | 12/2014 | Fujine | G09G 3/3413 | 345/589 |
| 2018/0144676 A1* | 5/2018 | Nadershahi | G09G 3/32 | |

* cited by examiner

*Primary Examiner* — Kirk W Hermann
(74) *Attorney, Agent, or Firm* — Michael T. Gabrik; Frank D. Cimino

(57) ABSTRACT

Systems, methods, and apparatus for pulse-width modulation sequence. In some examples, a controller configured to produce a sequence segment having a first time duration by stretching a building block sequence having a second time duration by a stretch factor and instruct a light modulator to set pixel elements based on the sequence segment, wherein the light modulator comprises the pixel elements.

20 Claims, 13 Drawing Sheets

SYSTEM, METHOD, AND APPARATUS FOR PULSE-WIDTH MODULATION SEQUENCE

DETAILED DESCRIPTION

Pulse-width modulation (PWM) sequences are utilized to control color temperature, brightness, quality, etc. of content (e.g., images and videos) presented on an optical system. A PWM sequence is defined for a video frame and divided into color segments associated with colors and bit segments. These bit segments include instructions for configuring a light modulator such as, for example, a spatial light modulator, a phase spatial light modulator, etc. in the optical system. The PWM sequence includes color instructions and data instructions for displaying images on the optical system throughout the video frame. These images correspond to the color segments of different colors and/or light modulator configurations and are integrated by the human eye to view a single image on the optical system.

Example approaches disclosed herein implement a PWM sequencer to produce sequence segments to build a PWM sequence. The sequence segments correspond to color segments and are associated with building block sequences, stretch factors, colors, etc. The sequence segments are in an order to be processed and executed to control an optical system for displaying images. Additionally, the PWM sequencer may produce signals independently from the PWM sequence.

Figure 1:
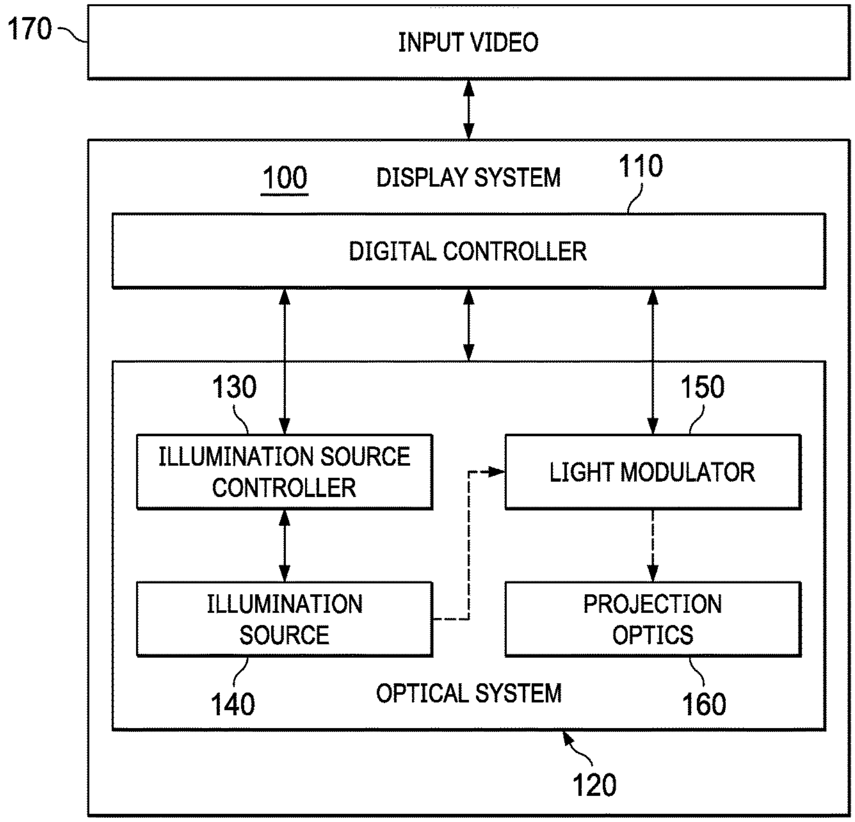
FIG. 1 is an example block diagram of a display system.

FIG. 1 is an example block diagram of a display system 100. The display system 100 may be implemented by any display system such as, for example, a projector system, a video wall, a multi-view monitor, a stereoscopic display, a monitor with multiple display surfaces, a multi-focal plane display, a near eye display (e.g., 3D glasses), a headset, a vehicle headlight, etc.

The display system 100 may include a digital controller 110 and an optical system 120.

The digital controller 110 may be implemented by hardware, software, firmware and/or any combination of hardware, software and/or firmware. In such examples, the digital controller 110 may be implemented by one or more analog or digital circuit(s), power management integrated circuits (PMIC(s)), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable logic device(s) (FPLD(s)) (such as field programmable gate arrays (FPGAs)), etc. Additionally, the digital controller 110 may include at least one memory including cache(s), random-access memory(s), hard disk drive(s), flash memory(s), read-only memory(s), compact disk(s), digital versatile disk(s), etc.

In some examples, the digital controller 110 is implemented in a housing or other structural frame of the optical system 120. As pictured, the display system 100 may be the digital controller 110 separate from a housing or other structural frame of the optical system 120. In such examples, the digital controller 110 may be in communication with the optical system 120 using a wired or wireless communication interface.

The optical system 120 includes an illumination source controller 130, an illumination source 140, a light modulator 150, and projection optics 160. In some examples, the optical system 120 is a projector system, a multi-view monitor, a video wall, a stereoscopic display, a monitor with multiple display surfaces, a multi-focal plane display, a near eye display (e.g., 3D glasses), a headset, a vehicle headlight, etc.

The illumination source controller 130 may be implemented by hardware, software, firmware and/or any combination of hardware, software and/or firmware. In such examples, the illumination source controller 130 may be implemented by one or more analog or digital circuit(s), PMIC(s), hardware processor(s), logic circuit(s), programmable processor(s), ASIC(s), PLD(s), FPLD(s), programmable controller(s), GPU(s), DSP(s), CGRA(s), ISP(s), etc.

The illumination source 140 may be implemented by any illumination source such as, for example, a set of light-emitting diodes (LEDs), lasers etc. In some examples, the illumination source 140 includes phosphors to convert the wavelength of light.

The light modulator 150 may be implemented by a light modulator of any type such as, for example, a spatial light modulator (e.g., a digital micromirror device (DMD), a liquid crystal display, a magneto-optic spatial light modulator, a liquid crystal on silicon (LcOS) display, a microLED display, etc.), or a phase spatial light modulator (PLM), etc.

The projection optics 160 may be implemented by any optical components such as, for example, lenses, etc.

An input video 170 contains display data (e.g., image data and/or video data) processed, for example, using real-time image scaling, gamma corrections, etc. The input video 170 may be of any format, resolution, etc. The input video 170 includes display data for a time duration of a video frame. The video frame may be associated with a frame rate such as, for example, 60 hertz (hz), 120 hz, 240 hz, 30 hz, etc. The frame rate may also be represented as a frame period with a frame period time duration such as, for example, 16.6 milliseconds (ms), 8.3 ms, 4.16 ms, 33.3 ms, etc.

The digital controller 110 produces output signals based on at least the input video 170 to display images on the optical system 120. For example, the output signals include color instructions provided to the illumination source controller 130. The illumination source controller may be coupled to the illumination source 140 to control the illumination source 140 based on the color instructions. Additionally, the output signals may include data instructions provided to the light modulator 150 to configure the light modulator 150.

The illumination source 140 may be optically coupled to the light modulator 150, and the light modulator 150 may be optically coupled to the projection optics 160. For example, the illumination source 140 emits light of a color to be utilized by the light modulator 150. As a result, the light modulator 150 transmits light to the projection optics 160. In some examples, the projection optics 160 illuminate a display, such as an image plane (e.g., a display screen), a headset, 3D glasses, a vehicle headlight, etc. based on the transmitted light.

Figure 2:
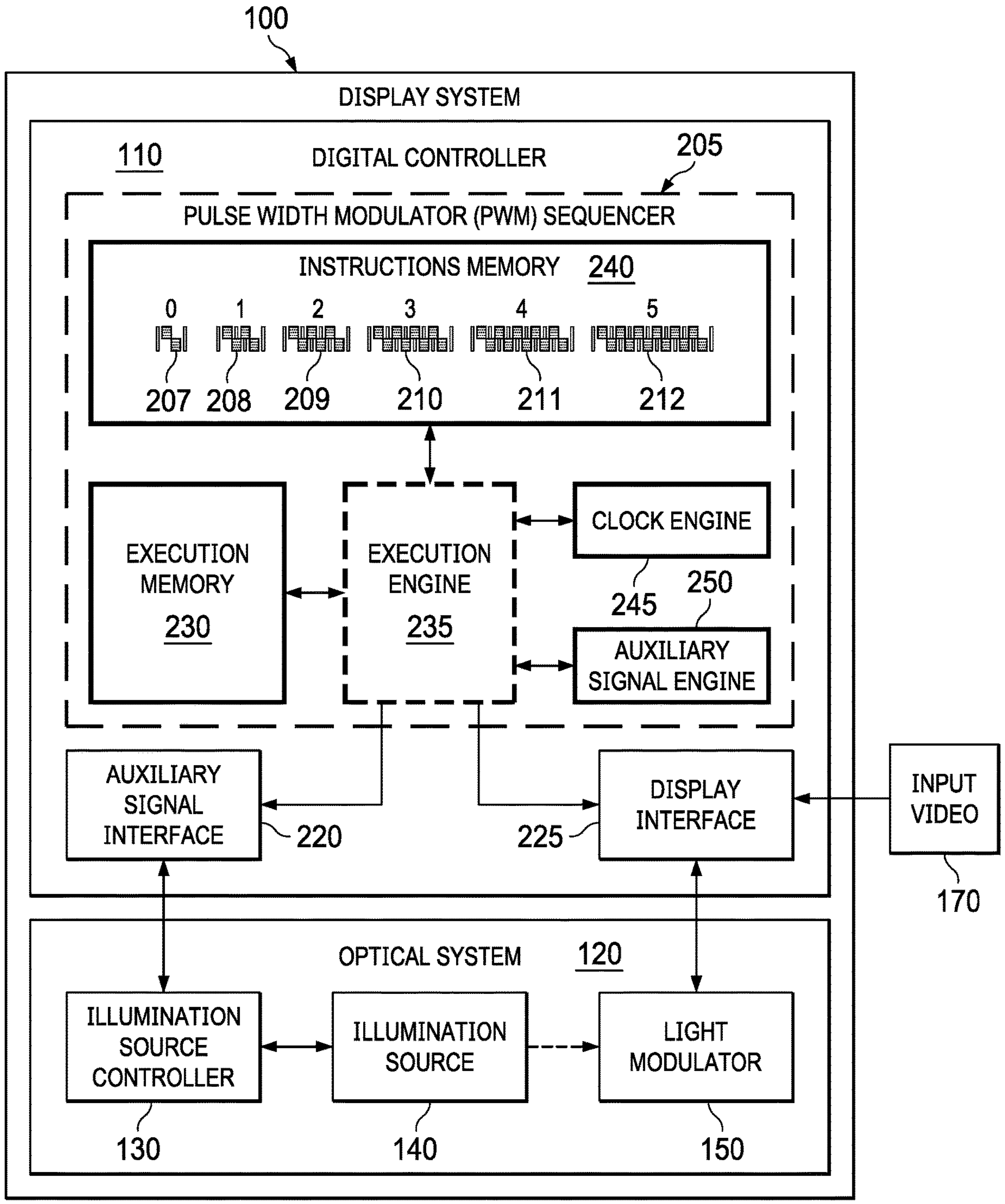
FIG. 2 is an example block diagram of the display system including a PWM sequencer.

FIG. 2 is a block diagram of an example implementation of the display system 100 of FIG. 1 including a PWM sequencer 205.

The display system 100 includes a digital controller 110 and an optical system 120, as described in connection to FIG. 1.

The digital controller 110 includes the PWM sequencer 205, an auxiliary signal interface 220, and a display interface 225.

The PWM sequencer 205 may be implemented by one or more systems-on-a-chip. The PWM sequencer 205 includes an execution memory 230, an execution engine 235, an instructions memory 240, a clock engine 245, and an auxiliary signal engine 250.

The execution memory 230 may be a memory such as, for example, at least one memory including cache(s), random-access memory(s), hard disk drive(s), flash memory(s), read-only memory(s), compact disk(s), digital versatile disk(s), etc.

The execution engine 235 may be implemented by at least one hardware processor. However, any other type of circuitry may additionally or alternatively be used such as, for example, one or more analog or digital circuit(s), PMIC(s), logic circuit(s), programmable processor(s), ASIC(s), PLD(s), FPLD(s), programmable controller(s), GPU(s), DSP(s), CGRA(s), ISP(s), etc.

The instructions memory 240 may be a memory such as, for example, at least one memory including cache(s), random-access memory(s), hard disk drive(s), flash memory(s), read-only memory(s), compact disk(s), digital versatile disk(s), etc. The instructions memory 240 stores instructions for execution by the execution engine 235. In some examples, the instructions memory 240 and the execution memory 230 is the same memory.

The clock engine 245 may be implemented by logic circuits. However, any other type of circuitry may additionally or alternatively be used such as, for example, one or more analog or digital circuit(s), PMIC(s), hardware processor(s), programmable processor(s), ASIC(s), PLD(s), FPLD(s), programmable controller(s), GPU(s), DSP(s), CGRA(s), ISP(s), etc.

The auxiliary signal engine 250 may be implemented by logic circuits. However, any other type of circuitry may additionally or alternatively be used such as, for example, one or more analog or digital circuit(s), PMIC(s), hardware processor(s), programmable processor(s), ASIC(s), PLD(s), FPLD(s), programmable controller(s), GPU(s), DSP(s), CGRA(s), ISP(s), etc. For example, the logic circuits are based on counter device(s).

The auxiliary signal interface 220 may be implemented by hardware, software, firmware and/or any combination of hardware, software and/or firmware. In such examples, the auxiliary signal interface 220 may be implemented by one or more analog or digital circuit(s), PMIC(s), hardware processor(s), logic circuit(s), programmable processor(s), ASIC(s), PLD(s), FPLD(s), programmable controller(s), GPU(s), DSP(s), CGRA(s), ISP(s), etc.

The display interface 225 may be implemented by hardware, software, firmware and/or any combination of hardware, software and/or firmware. In such examples, the display interface 225 may be implemented by one or more analog or digital circuit(s), PMIC(s), hardware processor(s), logic circuit(s), programmable processor(s), ASIC(s), PLD(s), FPLD(s), programmable controller(s), GPU(s), DSP(s), CGRA(s), ISP(s), etc.

While an example manner of implementing the digital controller 110 is illustrated in FIG. 2, one or more of the elements, processes and/or devices illustrated in FIG. 2 may be combined, divided, re-arranged, omitted, eliminated and/or implemented in any other way. Further, the execution engine 235, the clock engine 245, the auxiliary signal engine 250, the auxiliary signal interface 220, and/or the display interface 225 of FIG. 2 may be implemented by hardware, software, firmware and/or any combination of hardware, software and/or firmware. Thus, for example, any of the execution engine 235, the clock engine 245, the auxiliary signal engine 250, the auxiliary signal interface 220, and/or the display interface 225 and/or, more generally, the digital controller 110 could be implemented by one or more analog or digital circuit(s), PMIC(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example, the execution engine 235, the clock engine 245, the auxiliary signal engine 250, the auxiliary signal interface 220, and/or the display interface 225 and/or, more generally, the digital controller 110 is/are hereby expressly defined to include a non-transitory computer readable storage device or storage disk such as a memory, a digital versatile disk (DVD), a compact disk (CD), a Blu-ray disk, etc. including the software and/or firmware. Further still, the digital controller 110 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The optical system 120 may be implemented as described in connection to FIG. 1.

The PWM sequencer 205 utilizes PWM sequence instructions to build a PWM sequence.

The PWM sequence may be divided into color segments that correspond to red, green, or blue. In some cases, the color segments may correspond to any color such as, for example, cyan, magenta, yellow, white, etc. For example, a first color segment corresponds to red, a second color segment correspond to blue, etc. The color segments include bit segments corresponding to bit-planes. A bit-plane of a digital discrete signal may be a set of bits corresponding to a given bit position in the binary numbers representing the signal. These bit-planes may instruct data loaded to the light modulator 150. For example, the first color segment includes a first bit segment corresponding to a first bit-plane, a second bit segment corresponding to a second bit-plane, a third bit segment corresponding to the first bit-plane, etc.

The number of bit-planes may affect brightness and dithering. For example, as the number of bit-planes increase, the dithered frame period increases, which means a decrease of dithering. Dithering is introducing a noise signal to improve image quality. The dithered frame period may be repeated to fill the frame period. As a result of decreasing dithering, brightness may increase. An example of relations between bit-planes, brightness, and dithered frame period is illustrated below in table 1.

TABLE 1

| CASE | BRIGHTNESS | # BITPLANES REQUIRED | DITHERED FRAME PERIOD (MICROSECONDS) |
|---|---|---|---|
| 1 | <25 LUMENS | 1-3 | 450 |
| 2 | <300 LUMENS | 3-4 | 600 |
| 3 | 300-600 LUMENS | 4-5 | 750 |
| 4 | >600 LUMENS | 5-6 | 900 |

For example, case one includes low brightness (e.g., <25 lumens), a low number of bit-planes (e.g., 1 to 3 bit-planes), and high dithering (e.g., a low dithered frame period 450 microseconds corresponding to a high dithering frequency).

For example, case 4 includes high brightness (e.g., >600 lumens), a high number of bit-planes (e.g., 5 to 6 bit-planes), and low dithering (e.g., lowest dithered frame period 900 microseconds corresponding to a low dithering frequency). The color segments correspond to time durations, which are proportional to intensity levels. As a result, color segments with longer time durations will be perceived with a higher intensity level than color segments with shorter time durations by the human eye.

The color segments are associated with different colors, which affects a color temperature of content presented on optical system 120. The color temperature may be based on the duty cycle, which is a ratio of the total time durations associated with the different colors emitted by the illumination source 140 throughout the video frame of the PWM sequence. For example, the duty cycle ratio is (a first time duration corresponding to light of a first color): (a second time duration corresponding to light of a second color): (a third time duration corresponding to light of a third color). The sum of first time duration, second time duration and third time duration may be equal to the time duration of the video frame.

The instructions memory 240 stores building block sequences corresponding to different time durations and building block sequence instructions. For example, the instructions memory 240 includes a first building block sequence 207 corresponding to a building block index of zero, a second building block sequence 208 corresponding to a building block index of one, a third building block sequence 209 corresponding to a building block index of two, a fourth building block sequence 210 corresponding to a building block index of three, a fifth building block sequence 211 corresponding to a building block index of four, and a sixth building block sequence 212 corresponding to a building block index of five. Alternatively, the instructions memory 240 may include more or fewer than the six building block sequences. The building block sequences correspond to different time durations and building block sequence instructions. The building block sequence instructions include instructions to build the building block sequence. These building block sequence instructions may include one or more programmed operation codes (opcodes), etc. Opcodes may be the portion of the building block sequence instructions specifying operations to be performed by the execution engine 235. The opcodes may be designed to program delays for processing and/or executing sequence segments. In one example, the building block sequence instructions corresponding to the building block sequence are stored in one or more building block words.

The execution memory 230 stores sequence segments for sequence processing and execution. These sequence segments correspond to color segments, which may be designed based on image quality, intensity levels, brightness, color temperature, etc. The sequence segments define the color segments for the frame period of the video frame by selecting building block sequences from the instructions memory 240 and/or other factors discussed herein. As a result, the PWM sequence may be built by producing the sequence segments, which provides on-the-fly PWM sequence generation.

In some examples, the execution memory 230 stores the sequence segments by storing sequence segment entries in a lookup table. For example, a first sequence segment entry corresponds to a first color segment in the PWM sequence, a second sequence segment entry corresponds to a second color segment in the PWM sequence, etc. Additionally, the lookup table may include additional sequence segment entries to produce different PWM sequences. For example, a second PWM sequence is included in the lookup table and selected on-the-fly during run-time.

The one or more PWM sequences stored in the execution memory 230 may be customized based on frame rate, duty cycle, image quality specifications, system configurations, illumination variances of the display system 100 across customer products, any variances of the display system 100 across customer products, etc. Additionally, the one or more PWM sequences may be customized based on a mode for use. For example, a first PWM sequence is a presentation mode designed for input video 170 including still image content, such as slideshows. The first PWM sequence may be designed to have higher brightness and lower image quality to be suitable for still image content. For example, a second PWM sequence is a video mode designed for input video 170 including video content, such as movies. The second PWM sequence may be designed to have lower brightness and higher image quality to be suitable for video content. For example, a third PWM sequence is a power saving mode to reduce power consumption. The third PWM sequence may be designed to have lower brightness and higher image quality to be suitable for video content. For example, a fourth PWM sequence is based on a color temperature mode. The fourth PWM sequence may be designed to set a lower color temperature (makes the content appear more red or "warm") based on a duty cycle for the colors. This mode may be used for nighttime, dark rooms, etc. Alternatively, the fourth PWM sequence may be designed to set a higher color temperature (makes the content appear more blue or "cool") based on a duty cycle for the colors. This mode may be used for daytime, bright rooms, etc. Additional modes may include, 2D modes, 3D modes, augmented reality (AR) modes, virtual reality (VR) modes, vehicle headlight modes, etc. Any other PWM sequence may be designed composing of sequence segments stored in the execution memory 230 based on any factors.

The execution memory 230 storing more than one PWM sequence allows the settings to be changed on-the-fly and provides PWM sequence options. The digital controller 110 executing and processing a first PWM sequence may switch from a first PWM sequence to a second PWM sequence during run-time. The first PWM sequence and the second PWM sequence may be included in a lookup table in the execution memory 230. The digital controller 110 may receive a request to switch PWM sequences based on any condition such as, for example, content (e.g., video content and still image content), illumination source temperature (e.g., LED temperature and laser temperature), ambient light conditions surrounding the display (e.g., dark room and bright room), etc. For example, the digital controller 110 has been receiving input video 170 including presentation content and processing and executing a first PWM sequence of a presentation mode. In response to the digital controller 110 beginning to receive input video 170 including video content, the digital controller 110 may begin processing and executing a second PWM sequence of a video mode.

In some examples, sequence segments are associated with information, such as sequence segment indices, building block indices, stretch factors, and colors. An example lookup table may include sequence segment entries storing the information associated with the sequence segments. The example lookup table may be stored in the execution memory 230. The example lookup table is illustrated below in table 2.

TABLE 2

| SEQUENCE SEGMENT INDEX | BUILDING BLOCK INDEX | STRETCH FACTOR | COLOR |
|---|---|---|---|
| 0 | 4 | 1.1× | R |
| 1 | 5 | 1.2× | G |
| 2 | 4 | 1.1× | R |
| 3 | 5 | 1.2× | G |
| 4 | 3 | 1.5× | B |
| 5 | 4 | 1.1× | R |
| 6 | 5 | 1.2× | G |
| 7 | 4 | 1.1× | R |
| 8 | 5 | 1.2× | G |
| 9 | 3 | 1.5× | B |
| 10 | 0 | 1× | — |

The sequence segment indices in table 2 define an order of processing and executing the sequence segments to build the PWM sequence. The example lookup table may be defined based on one or more requests received by the digital controller 110. For example, a first sequence segment entry is associated with a sequence segment index of "0" (e.g., the first building block sequence 207), a second sequence segment entry of the PWM sequence is associated with an index of "1" (e.g., the second building block sequence 208), etc.

The building block indices in table 2 correspond to indices of building block sequences in the instructions memory 240. For example, the second sequence segment of the PWM sequence is associated with an index of "5." Therefore, the building block sequence corresponding to the index of "5" in the instructions memory 240 (e.g., the sixth building block sequence 212) is used for sequence processing and execution by the digital controller 110.

The execution engine 235 stretches the corresponding building block sequences by the factors indicated by the stretch factors in table 2. For example, the second sequence segment entry is associated with a value of "1.2×," which indicates to have the execution engine 235 stretch the building block index of "5" in the instructions memory 240 (e.g., the sixth building block sequence 212) by 20% (e.g., multiplying the building block sequence by 1.2).

The colors correspond to red, green, blue, or any other color. For example, the first sequence segment entry is associated with a value of "R," which indicates to drive the illumination source 140 to emit light of red during the first sequence segment time duration.

The execution engine 235 may send a refresh instruction to the display interface 225 for refreshing the light modulator 150. For example, the sequence segment entry in table 2 corresponding to the sequence segment index "10" indicates to refresh the light modulator 150. In some examples, refreshing the light modulator 150 is performed to ensure the mechanical elements in the light modulator 150 continue to function. In one example, refreshing the light modulator 150 prevents the mechanical elements (e.g., mirrors) becoming unresponsive or "stuck." In one example, refreshing the light modulator 150 includes loading inverse data of the data currently loaded on the light modulator 150. However, any other refresh technique may be utilized.

The execution engine 235 may be coupled to the execution memory 230, the instructions memory 240, the clock engine 245, the auxiliary signal engine 250, the auxiliary signal interface 220, and the display interface 225. The execution engine 235 may be utilized to perform sequence processing and execution based on at least the PWM sequence defined in the execution memory 230. The execution engine 235 may build the sequence segments defined in the execution memory 230 to form the PWM sequence.

The execution engine 235 reads a sequence segment word from the execution memory 230. The sequence segment word may include the information associated with the sequence segment entry such as, for example, the sequence segment index, the building block index, the stretch factor, the color, etc.

The execution engine 235 reads one or more building block words from the instructions memory 240 based on the building block sequence indicated in the sequence segment word.

The execution engine 235 sends a color selection instruction to the auxiliary signal engine 250. The color selection instruction may be selected based on the color indicated in the sequence segment word.

The execution engine 235 sends auxiliary instructions based on the building block sequence instructions to the auxiliary signal engine 250. The auxiliary instructions include the building block sequence instructions or a portion of the building block sequence instructions for the auxiliary signal engine 250 to process. The auxiliary instructions include instructions related to the timing of when the stretch factor is to be applied to the building block sequence instructions.

The auxiliary signal engine 250 processes the auxiliary instructions and the color selection from the execution engine 235. For example, the auxiliary signal engine 250 processing the auxiliary instructions indicates a time to send a first stretch event to the execution engine 235. The auxiliary signal engine 250 may send the first stretch event at the time to the execution engine 235, which indicates when to apply the stretch factor for the execution engine 235. For example, the auxiliary signal engine 250 processing the auxiliary instructions indicates a time to send a color event to the execution engine 235. The auxiliary signal engine 250 may send the color event at the time to the execution engine 235. The time to send the color event synchronizes the color illumination with the reset data command.

The execution engine 235 sends the stretch factor indicated in the sequence segment word to the clock engine 245. Additionally, the execution engine 235 sends a second stretch event to the clock engine 245. The second stretch event is sent to the clock engine 245 in response to the first stretch event received by the execution engine 235 from the auxiliary signal engine 250.

The clock engine 245 produces a stretch signal in response to receiving the second stretch event and the stretch factor from the execution engine 235. The clock engine 245 receives the stretch factor before the second stretch event. Alternatively, the clock engine 245 receives the stretch factor and the second stretch event at the same time. The second stretch event indicates the clock engine 245 is to begin producing the stretch signal for the execution engine 235. The stretch signal is produced based on the stretch factor. For example, the stretch factor is associated with a value of "×1.2," which indicates the stretch signal is to enable the execution engine 235 to stretch a building block sequence by 20%. The stretch signal is provided to the execution engine 235.

The execution engine 235 produces the sequence segment based on building block sequence instructions and the stretch signal. The building block sequence instructions are included in the building block word read by the execution engine 235. The stretch signal is from the clock engine 245. The building block sequence instructions may include timing to send load data events and/or reset data events. The execution engine 235 utilizes the stretch signal to stretch the building block sequence instructions to produce the sequence segment. The stretching of the building block sequence instructions may produce timing to send load data events and/or reset data events different than the timing included in the building block sequence instructions. The execution engine 235 sends the sequence segment to the display interface 225.

The display interface 225 produces load data commands for the light modulator 150. The load data commands may be based on the sequence segment and the input video 215. The load data commands may be sent to the light modulator 150 based on a timeline of load data commands defined by the sequence segment. For example, the execution engine 235 sends a load data event to the display interface 225 based on the sequence segment. The display interface 225 sends the load data command to the light modulator 150 in response to the display interface 225 receiving the load data event from the execution engine 235. In some examples, the load data command instructs data to be loaded to pixel elements in the light modulator 150. The data stores a configuration of the pixel elements. Details of the load data command are discussed in connection to FIGS. 3 and 4.

The display interface 225 produces reset data commands for the light modulator 150. In some examples, pixel elements included in the light modulator 150 are configured to control how light is transmitted from the light modulator 150 to the projection optics 160 of FIG. 1. The reset data commands are sent based on a timeline of reset data commands defined by the sequence segment. For example, the execution engine 235 sends a reset data event to the display interface 225 based on the sequence segment. The display interface 225 sends the reset data command to the light modulator 150 in response to the display interface 225 receiving the reset data event from the execution engine 235. The reset data command is sent at a time after data has been loaded to the light modulator 150 and/or a time duration from when a previous sequence segment has ended. The reset data command indicates the start time of a time duration corresponding to the sequence segment. In some examples, the reset data command instructs the light modulator 150 to configure pixel elements based on the loaded data in the pixel elements. The configuration of the pixel elements may control how light is transmitted from the light modulator 150 to projection optics. Details of the reset data command are discussed in connection to FIGS. 3 and 4.

The execution engine 235 sends color instructions to the auxiliary signal interface 220 in response to receiving the color event. The color instructions indicate the colors for the illumination source 140 to emit for the color segment durations, which matches the sequence segment duration.

The auxiliary signal interface 220 asserts at least one signal to indicate the color for the color segment duration based on the color instructions from the execution engine 235. The at least one signal may be sent to the illumination source controller 130.

The illumination source controller 130 controls the illumination source 140 based on the at least one signal from the auxiliary signal interface 220. For example, the illumination source 140 emits light of a color based on the at least one signal. For example, the color is any color, such as red, green, blue, cyan, magenta, yellow, white, etc.

In some examples, the auxiliary signal engine 250 enables signals to be produced independently from sequence segment instructions associated with the PWM sequence. The auxiliary signal engine 250 may produce auxiliary commands for the auxiliary signal interface 220. The auxiliary commands are sent via the execution engine 235 to the auxiliary signal interface 220. The auxiliary signal interface 220 asserts signals for the respective element based on the auxiliary commands. For example, the auxiliary signal engine 250 is programmed to delay producing auxiliary commands for the auxiliary signal interface 220. As a result, the auxiliary signal interface 220 delays asserting signals for the illumination source controller 130 to control the illumination source 140.

For example, the auxiliary signal engine 250 is programmed to control a phosphor color wheel. In one example, the illumination source 140 includes a phosphor color wheel and a light source coupled to the auxiliary signal interface 220. The phosphor color wheel may be optically coupled to the light source and the light modulator 150. The phosphor color wheel may include regions having different phosphor compositions. Alternatively, any other materials that exhibit fluorescence and/or phosphorescence may be used. The regions produce different colored light (e.g., red, blue, green, etc.) when light from the light source is incident thereon based on the phosphor compositions. The phosphor color wheel may rotate to expose the different regions to the light from the light source thereby producing different colored light. The phosphor color wheel may rotate to produce the light of a color associated with the color segment. As a result, the colored light is directed to the light modulator 150. The light of the color may be synchronously outputted with a start time of the color segment. The auxiliary signal engine 250 may send auxiliary commands to the auxiliary signal interface 220 via the execution engine 235 to aid locking and/or aligning the phosphor color wheel for synchronization with color segments. The auxiliary signal interface 220 asserts signals for the phosphor color wheel based on the auxiliary commands. In one example, the auxiliary commands lock the frequency and/or align the phase of the phosphor color wheel based on the sequence segment. The auxiliary signal interface 220 asserts signals to rotate the phosphor color wheel synchronously with the timing and duration of the sequence segment based on the auxiliary commands.

In another example, the auxiliary signal engine 250 is programmed to control elements associated with a near eye display (e.g., 3D glasses). For example, an element may be coupled to the auxiliary signal interface 220. The auxiliary signal engine 250 may send auxiliary commands to the auxiliary signal interface 220 via the execution engine 235 to control the element. The auxiliary signal interface 220 asserts signals for the element based on the auxiliary commands. For example, the auxiliary signal engine 250 is programmed to control a resolution enhancement actuator. The resolution enhancement actuator may be coupled to the auxiliary signal interface 220. The resolution enhancement actuator may be optically coupled to the light modulator 150 and the projection optics 160 of FIG. 1. The resolution enhancement actuator may be utilized to increase the resolution perceived by a human eye viewing a display such as, for example, an image plane (e.g., a display screen), a headset, 3D glasses, a vehicle headlight, etc. illuminated by the projection optics 160 of FIG. 1. In one example, the resolution enhancement actuator includes a glass window glass to direct light received from the light modulator 150. The resolution enhancement actuator may tilt the glass window to shift the light corresponding to pixels from the light modulator 150, for example by half a pixel in each direction. For example, the pixels from the light modulator 150 displays 60 frames per second (e.g., 60 hertz) and the glass window tilts to make each pixel appear in four different positions per frame. As a result, four times the resolution of the light modulator 150 is perceived by the human eye viewing the display. The auxiliary signal engine 250 may send auxiliary commands to the auxiliary signal interface 220 via the execution engine 235 to control the resolution enhancement actuator. In one example, auxiliary commands indicate to activate or deactivate the resolution enhancement actuator. The auxiliary signal interface 220 asserts signals for the resolution enhancement actuator based on the auxiliary commands.

Figure 3:
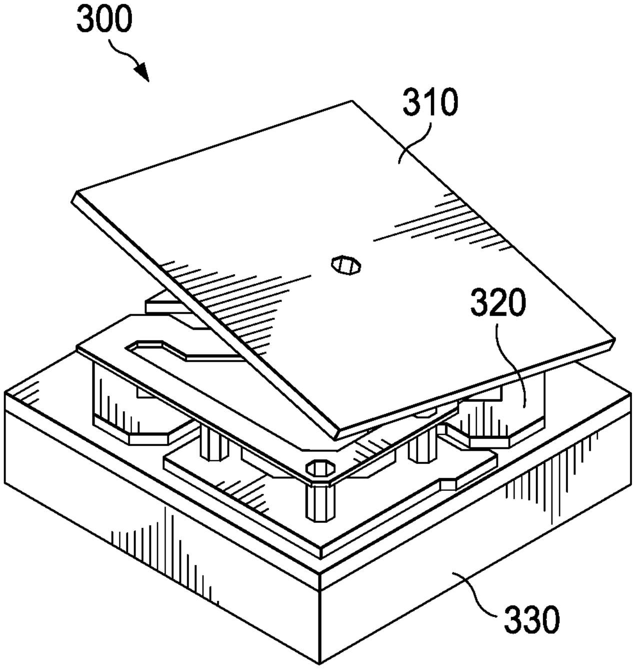
FIG. 3 is an example illustration of the light modulator.

FIG. 3 is an example illustration of an example of the light modulator 300, where the light modulator 300 is a DMD. In some examples, the light modulator 300 is an example of the light modulator 150 of FIG. 1. The light modulator 300 includes pixel elements associated with pixels of an image.

In some examples, the light modulator 300 includes an array of pixel elements such as, for example, a 1,920×1,080 array of pixel elements. Alternatively, the array of pixel elements may be any size. The array of pixel elements may include, but not limited to, micromirrors, micromirror control elements, and memory cells. In one example, the memory cells are complementary metal-oxide semiconductor (CMOS) static random-access memory (SRAM) memory cells embedded on a semiconductor substrate. The data included in the load data commands from the display interface is stored in the memory cells.

The example illustration of the light modulator 300 illustrates a pixel element from the array of pixel elements. The pixel element may include a micromirror 310, micromirror control elements 320, and a memory cell 330. A load data command from the display interface 225 writes a memory state such as, for example, a '0' or '1' to the memory cell 330. In one example, a '1' indicates the micromirror to be an "on" state (e.g., the micromirror 310 reflects light from the micromirror 310 to the projection optics 160). The micromirror may be tilted at a positive twelve degrees (e.g., positive meaning tilted towards the projection optics 160) for the "on" state. The '0' may indicate the micromirror to be an "off" state (e.g., the micromirror 310 reflects light from the micromirror 310 away from the projection optics 160). The micromirror may be tilted at a negative twelve degrees (e.g., negative meaning tilted away from the projection optics 160) for the "off" state. A reset data command from the display interface 225 may indicate to the micromirror control elements 320 to change the state of the micromirror 310 from the current state to the memory state stored in the memory cell 330. For example, the reset data command may configure the state of the micromirror 310 to be an "on" state if '1' is written to the memory cell.

Figure 4:
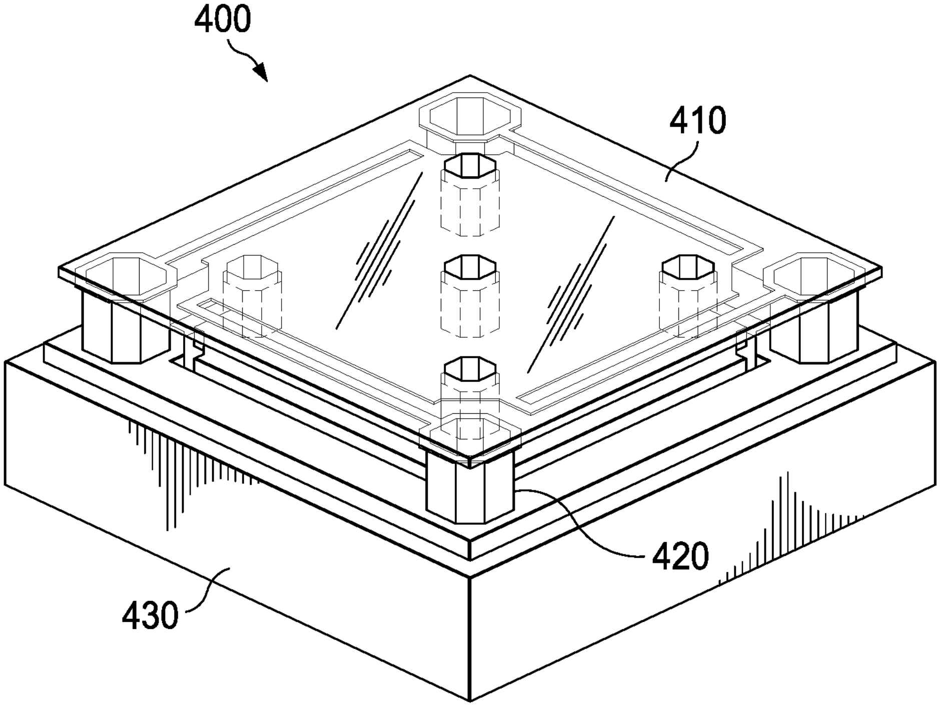
FIG. 4 is an example illustration of the light modulator.

FIG. 4 is an example illustration of an example of the light modulator 400, where the light modulator 400 is a PLM. In some examples, the light modulator 400 is an example of the light modulator 150 of FIG. 1. The light modulator 400 includes pixel elements associated with pixels of an image.

In some examples, the light modulator 400 includes an array of pixel elements such as, for example, a 1,920×1,080 array of pixel elements. Alternatively, the array of pixel elements may be any size. The array of pixel elements may include, but not limited to, micromirrors, micromirror control elements, and memory cells. In one example, the memory cells are complementary metal-oxide semiconductor (CMOS) static random-access memory (SRAM) memory cells embedded on a semiconductor substrate. The data included in the load data commands from the display interface is stored in the memory cells.

The example illustration of the light modulator 400 illustrates a pixel element from the array of pixel elements. The pixel element may include a micromirror 410, micromirror control elements 420, and memory cells 430. In one example, the memory cells 430 include four memory cells, arranged as a 2×2 CMOS SRAM memory cell array. A load data command from the display interface 225 may write a '0' or '1' to the memory cells 430. In the case of four memory cells, there are sixteen memory states. The different memory states may be utilized to improve diffraction efficiency of different wavelengths. The different memory states may be associated with different vertical states of the micromirror 410. A reset data command from the display interface 225 may indicate to the micromirror control elements 420 to change the state of the micromirror 410 from the current state to the memory state written in the memory cells 430. For example, the reset data command may configure the state of the micromirror 410 to be displaced vertically (e.g., moving towards or away from the semiconductor substrate) corresponding to the memory state written in the memory cells 430.

Figure 5:
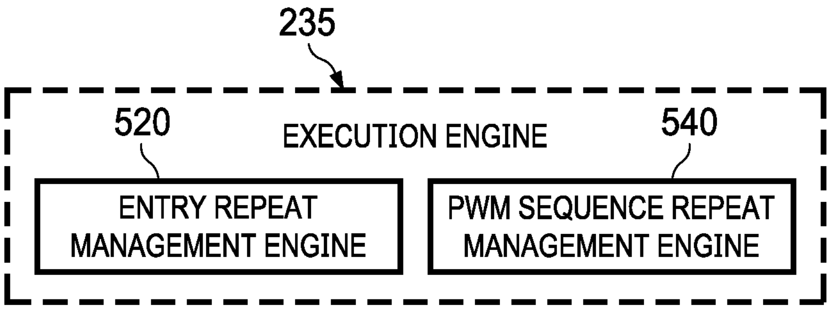
FIG. 5 is an example block diagram of an execution engine.

FIG. 5 is an example block diagram of an execution engine 235 including additional hardware elements described in FIG. 2 to implement a hardware approach. For example, the execution engine 235 implements the execution engine 235 of FIG. 2. Alternatively, one or more of the additional hardware elements are not included in the execution engine 235 to implement a more software approach. Similar functions described in connection to the additional hardware elements are instead performed by software when implementing the more software approach.

For example, the execution engine 235 is used for a hardware approach. The execution memory 230 of FIG. 2 may have information associated with a sequence segment entry such as, for example, a sequence segment repeat value.

For example, if a first sequence segment entry has a sequence segment repeat value of "2," the digital controller 110 will repeat processing and executing the sequence segment two times. As a result, the sequence segment will be processed and executed three times to have the first three color segments of the PWM sequence based on the sequence segment. Alternatively, any other method may be used to track whether a sequence segment entry is to repeat being processed and executed. Additionally, the execution memory 230 may include a global repeat value. The global repeat value may indicate a number of times to repeat the PWM sequence, which includes processing and executing the sequence segments in the PWM sequence.

The execution engine 235 includes the entry repeat management engine 520 and the PWM sequence repeat management engine 540.

The entry repeat management engine 520 and the PWM sequence repeat management engine 540 may be implemented by logic circuits. However, any other type of circuitry may additionally or alternatively be used such as, for example, one or more analog or digital circuit(s), PMIC(s), hardware processor(s), programmable processor(s), ASIC (s), PLD(s), FPLD(s), programmable controller(s), GPU(s), DSP(s), CGRA(s), ISP(s), etc.

The entry repeat management engine 520 determines whether a sequence segment that has been processed and executed is to be repeated. For example, the number of times for the sequence segment to be repeated is based on a sequence segment repeat value that corresponds to the sequence segment. The execution engine 235 may begin to process and execute either the current sequence segment or a next sequence segment in the execution memory 230 based on the entry repeat management engine 520.

The PWM sequence repeat management engine 540 determines whether a PWM sequence executed and processed should be repeated for execution and processing. For example, the number of times for the PWM sequence to be repeated is based on a PWM sequence execution index associated with the global repeat value. The PWM sequence execution index may indicate how many times the PWM sequence has been executed and processed. The execution engine 235 may begin to process and execute either the current lookup table including the PWM sequence or a next lookup table including a different PWM sequence based on the PWM sequence repeat management engine 540.

Figure 6:
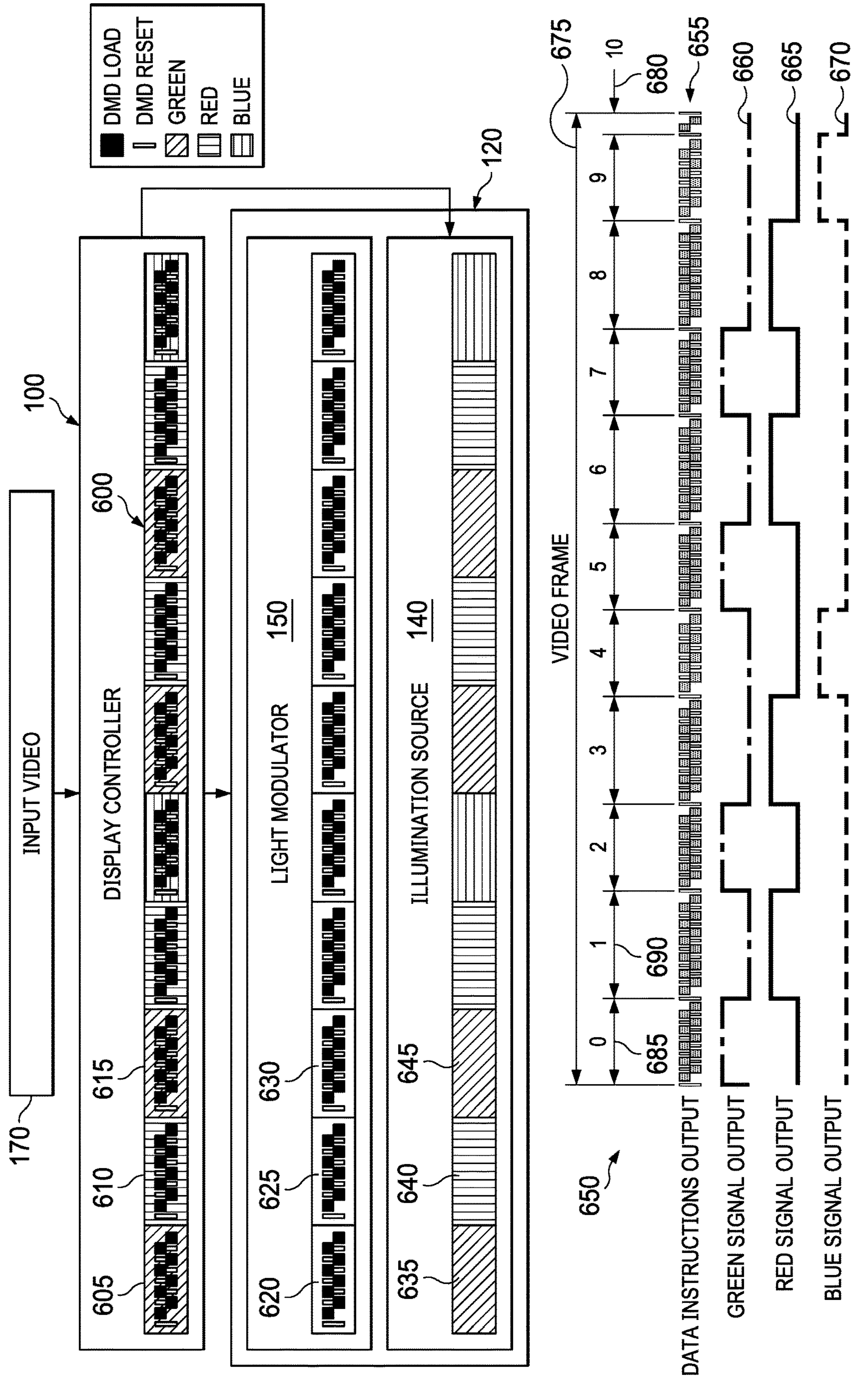
FIG. 6 is an example illustration of execution of a PWM sequence.

FIG. 6 is an example illustration of execution of a PWM sequence in the display system 100 of FIG. 1.

The PWM sequence is composed of the color segments 600, which are associated with sequence segment entries stored in the digital controller 110. For example, the color segments 600 include ten color segments: four color segments of red, four color segments of green, and two color segments of blue. A first color segment 605 corresponds to green and a first time duration, a second color segment 610 corresponds to red and a second time duration, and a third color segment 615 corresponds to green and a third time duration, etc. However, any number of color segments and combination of colors may be defined in the PWM sequence. For example, the colors include cyan, magenta, yellow, white, etc.

In one example, to store a first sequence segment corresponding to the first color segment 605 in the execution memory 230, the first sequence segment is associated with a first value. The first value may indicate the first sequence segment is to be processed and executed first by the execution engine 235.

The time duration of the first color segment 605 may be set by associating the first sequence segment with a building block sequence less than or equal to the time duration. For example, a first building block sequence has a time duration of 200 microseconds, a second building block sequence has a time duration of 500 microseconds, a third building block sequence has a time duration of 800 microseconds, etc. The time duration of the first color segment 605 may be 700 microseconds, therefore the second building block sequence may be selected. As a result, the first sequence segment is associated with a building block index of a second value, the second value corresponding to the index of the second building block sequence stored in the instructions memory 240.

After the building block sequence has been selected, the first sequence segment may be associated with a stretch factor greater than or equal to one. For example, the selected second building block sequence has a time duration of 500 microseconds and the time duration of the first color segment 605 is 700 microseconds. The stretch factor may be "1.4×," indicating 500 microseconds is stretched by 40% to obtain the design time duration of 700 microseconds.

The green color may be achieved by associating the first sequence segment with "G". The value of "G" indicates to drive the illumination source 140 of FIG. 1 to emit light of green for the duration of the first sequence segment.

The digital controller 110 produces output signals 650 for the optical system 120. In some examples, the output signals 650 include data instructions output 655 to configure the light modulator 150 of FIG. 1 and signals to control the illumination source 140. The signals to control the illumination source 140 may be associated with any color such as, for example, a green signal output 660, a red signal output 665, and a blue signal output 670. The output signals 650 are produced for the sequence segments 680 for a video frame 675.

In some examples, the digital controller 110 issues data instructions including a first set of load data commands and reset data commands 620, a second set of load data commands and reset data commands 625, a third set of load data commands and reset data commands 630, etc. for the light modulator 150. For example, the first set of load data commands and reset data commands 620 are based on at least bit segments associated with the first color segment 605 and the input video 170 of FIG. 1. A first load data command may load first data for half of the light modulator 150 and a second load data command may load second data for the other half of the light modulator 150 based on the first color segment 605. A first reset data command may configure the light modulator 150 at a time after the first data has been loaded to the light modulator 150. The first data indicates a configuration for the light modulator 150. A second reset data command may configure the light modulator 150 at a time after the second data has been loaded to the light modulator 150. The second data indicates a configuration for the light modulator 150. Alternatively, one reset data command may be issued to apply both the data loaded from the first load data command and the second load data command. In some examples, any combinations of load data commands and reset data commands for the first set of load data commands and reset data commands 620 is done. The first set of load data commands and reset data commands 620 corresponds to the first sequence segment 685 portion of the data instructions output 655, the second set of load data commands and reset data commands 625 corresponds to the second sequence segment 690 portion of the data instructions output 655, etc.

The digital controller 110 provides at least one first signal associated with a first color duration 635, at least one second signal associated with a second color duration 640, at least one third signal associated with a first color duration 645, etc. to the illumination source controller 130 of FIG. 1. For example, the at least one first signal is based on at least the color green associated with the first color segment 605 and the input video 170 of FIG. 1. The illumination source controller 130, in response to receiving the at least one first signal, drives the illumination source 140 to emit light of green for a first color duration 635 based on at least the green color associated with the first color segment 605. For example, the rising edge for the green signal output 660 drives the illumination source 140 to emit green light until the falling edge for the green signal output 660. The at least one first signal associated with a first color duration 635 corresponds to the first sequence segment 685 portion of the green signal output 660, the at least one second signal associated with a second color duration 640 corresponds to the second sequence segment 690 portion of the data instructions output 655, etc.

Figure 7:
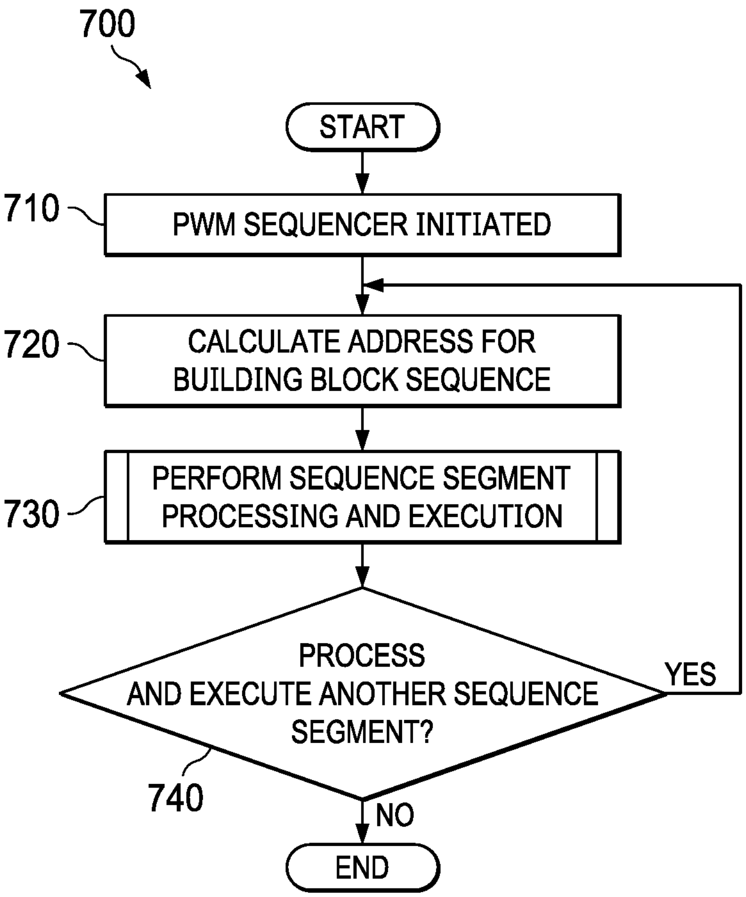
FIG. 7 is a flowchart representative of an example process that may be performed using machine-readable instructions that may be executed by a processor and/or hardware configured to implement the digital controller and/or the display system.

FIG. 7 is a flowchart representative of an example process 700 that may be performed using configured hardware and/or machine-readable instructions that may be executed by a processor to implement the digital controller 110 of FIG. 1 and/or the display system 100 of FIG. 1 to implement a first sequence processing and execution technique.

The example process 700 of FIG. 7 begins at block 710, at which the PWM sequencer 205 is initiated. For example, the PWM sequencer 205 is initiated in response to the digital controller 110 obtaining an input video, such as the input video 215 described in connection to FIG. 2.

At block 720, the execution engine 235 calculates the address for a building block sequence. The address may be calculated by the execution engine 235 based on the order of the building block sequences programmed by software. Alternatively, the execution engine 235 may calculate the address by reading a sequence segment word including a building block index from the execution memory 230. The execution engine 235 may determine the address for the building block sequence based on the building block index.

At block 730, the display system 100 performs sequence segment processing and execution. The sequence segment processing and execution includes at least the auxiliary signal interface 220 driving the illumination source 140 to emit light and the display interface 225 issuing a set of reset data commands and load data commands to configure the light modulator 150. Details of block 730 to perform sequence segment processing and execution are disclosed in connection to FIGS. 8-11.

At block 740, the execution engine 235 determines whether to process and execute another sequence segment.

If the execution engine 235 determines there is another sequence segment to process (e.g., block 740 returns a result of "YES"), the execution engine 235 returns to block 720. For example, the PWM sequence includes another sequence segment following the processed and executed sequence segment.

If the execution engine 235 determines there is not another sequence segment to calculate (e.g., block 740 returns a result of "NO"), the example process 700 terminates.

Figure 8:
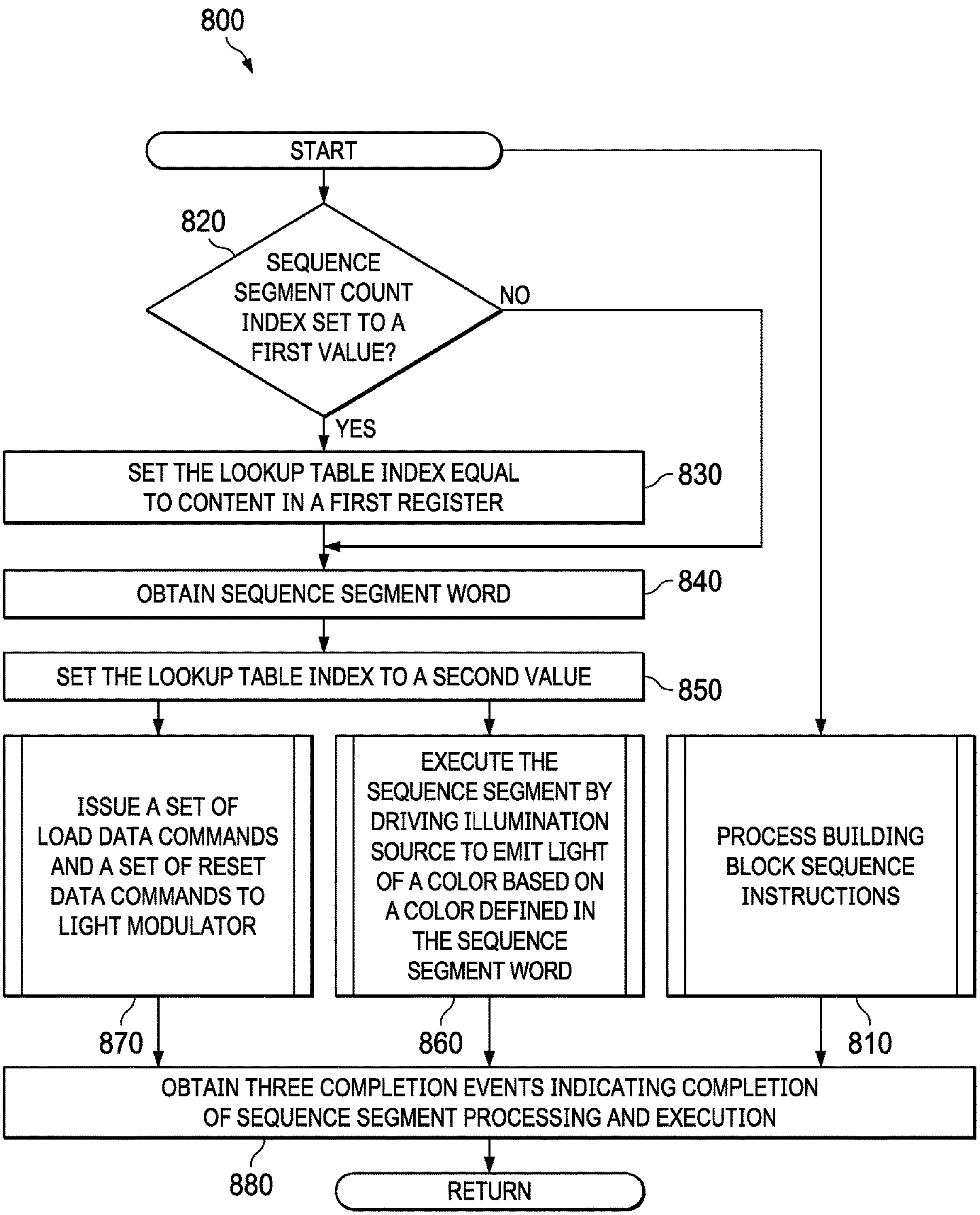
FIG. 8 is a flowchart representative of an example process.

FIG. 8 is a flowchart representative of an example process 800 to perform sequence segment processing and execution. The example process 800 is an example of block 730 described in connection with FIG. 7.

At block 810, the digital controller 110 of FIG. 1 processes the building block sequence instructions. An approach to process building block instructions is disclosed in further detail in connection with FIG. 9.

At block 820, the execution engine 235 determines whether a sequence segment count index is set to a first value. In one example, the first value is zero, which corresponds to the first sequence segment. In other examples, the first value is one, or another value, which corresponds to the first sequence segment. The sequence segment count index may indicate the current index of the PWM sequence. For example, sequence segment count index=0 indicates the first sequence segment in the PWM sequence, sequence segment count index=1 indicates the second sequence segment in the PWM sequence, sequence segment count index=2 indicates the third sequence segment in the PWM sequence, etc.

At block 830, if the execution engine 235 determines the sequence segment count index is set to the first value (e.g., block 820 returns a result of "YES"), the execution engine 235 sets a lookup table index to the value in a first register. The value in the first register may include a start lookup table index corresponding to a first sequence segment entry in the execution memory 230.

If the execution engine 235 determines the sequence segment count index is not set to the first value (e.g., block 820 returns a result of "NO"), the execution engine 235 continues to block 840. For example, the sequence segment count index being not set to the first value indicates the lookup table index has been previously set. The lookup table index may be previously set from a previous iteration, which indicates the sequence segment being processed and executed is not the first sequence segment in the PWM sequence.

At block 840, the execution engine 235 obtains a sequence segment word. The sequence segment word corresponds to a sequence segment entry in the execution memory 230. The sequence segment entry may be based on the lookup table index. For example, the lookup table index=0 corresponds to a first sequence segment entry, the lookup table index=1 corresponds to a second sequence segment entry, etc. The sequence segment word may include information such as, for example, a stretch factor, a color, etc.

At block 850, the execution engine 235 sets the lookup table index to a second value. In one example, the second value is the first value incremented by one. Alternatively, any other method may be used to track which sequence segment entry is to be processed and executed.

At block 860, the digital controller 110 executes the sequence segment by driving the illumination source 140 to emit light of a color based on a color defined in the sequence segment word. An approach to drive the illumination source 140 to emit light of a color based on a color defined in the sequence segment word is disclosed in further detail in connection with FIG. 10.

At block 870, the digital controller 110 executes the sequence segment by issuing a set of load data commands and a set of reset data commands to the light modulator 150 of FIG. 1. An approach to issue the set of load data commands and the set of reset data commands are disclosed in further detail in connection with FIG. 11.

At block 880, the execution engine 235 obtains three completion events indicating completion of sequence segment processing and execution. These three completion events correspond to completion of the processes of block 850, block 860, and block 870. Alternatively, the execution engine 235 may obtain any other event(s) indicating the sequence processing and execution has been completed.

The example process 800 of FIG. 8 terminates and returns to block 740 of FIG. 7.

Figure 9:
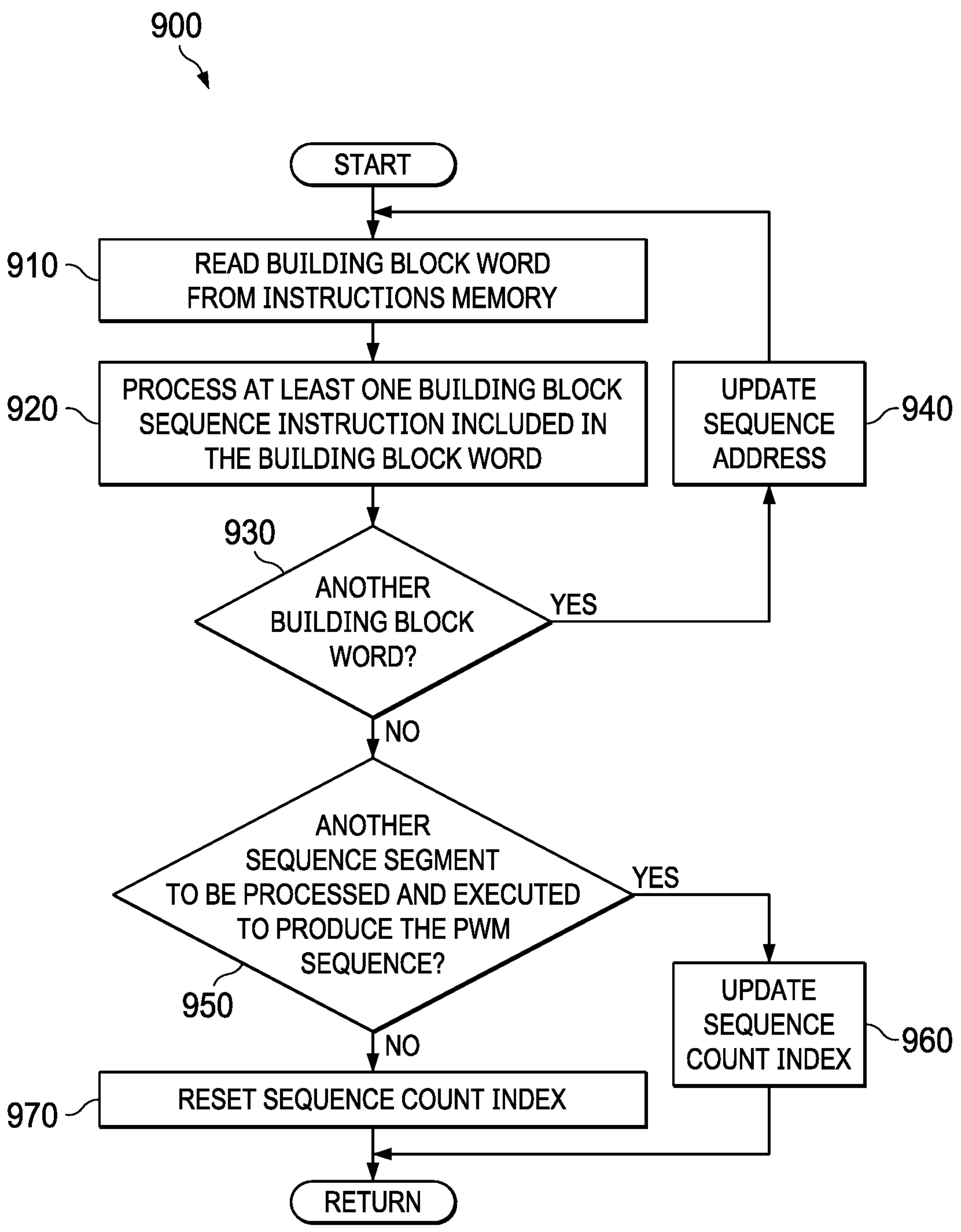
FIG. 9 is a flowchart representative of an example process.

FIG. 9 is a flowchart representative of an example process 900 to process the building block sequence instructions. The example process 900 is an example of block 810 described in connection with FIG. 8.

The example process 900 of FIG. 9 begins at block 910 when the execution engine 235 reads a building block word from the instructions memory 240. The building block word corresponds to a sequence address. The sequence address may correspond to the building block sequence address calculated in block 720 of FIG. 7. Additionally, this building block word corresponds to the building block sequence associated with the sequence segment. The building block word includes at least one building block sequence instruction. For example, the at least one building block sequence instruction includes one or more programmed operation codes, etc.

At block 920, the execution engine 235 processes the at least one building block sequence instruction. The building block sequence instruction is included in the building block word. For example, decoding the building block sequence instructions produce auxiliary instructions for the auxiliary signal engine 250.

At block 930, the execution engine 235 determines whether there is another building block word. For example, a sequence address indicates whether another building block word is to be read.

If the execution engine 235 determines there is another building block word (e.g., block 930 returns a result of "YES"), the execution engine 235 continues to block 940. For example, the sequence address indicates another building block word corresponding to the building block sequence associated with the sequence segment. Therefore, at least one additional building block sequence instruction is to be processed.

At block 940, the execution engine 235 updates the sequence address. The sequence address may be updated to correspond to the next building block word to be read. For example, the sequence address is incremented by 1. The execution engine 235 then returns to block 910.

If the execution engine 235 determines there is not another building block word (e.g., block 930 returns a result of "NO"), the execution engine 235 continues to block 950. The stretching of the building block sequence described in connection to FIG. 11 may occur in parallel while processing the building block sequence. Therefore, the sequence segment may be executed or partially executed by the end of decoding the at least one building block sequence instruction.

At block 950, the execution engine 235 determines whether there is another sequence segment to be processed and executed to produce the PWM sequence. For example, determining if there is another sequence segment to be processed and executed is based on whether a sequence segment count index is equal to the value in a second register minus one. The second register may include the number of sequence segments to be executed for the PWM sequence.

If the execution engine 235 determines there is another sequence segment to be processed and executed to produce the PWM sequence (e.g., block 950 returns a result of "YES"), the execution engine 235 continues to block 960.

If the execution engine 235 determines there is not another sequence segment to be processed and executed to produce the PWM sequence (e.g., block 950 returns a result of "NO"), the execution engine 235 continues to block 970.

At block 960, the execution engine 235 updates the sequence segment count index. For example, the sequence segment count index is incremented by 1. Alternatively, the sequence segment count index may be updated in any other way to indicate the sequence segments processed and executed. Additionally, the execution engine 235

At block 970, the execution engine 235 resets the sequence segment count index. For example, the sequence segment count index may be set to zero. Alternatively, the sequence segment count index may be updated in any other way to indicate no sequence segments have been processed and executed.

The example process 900 of FIG. 9 terminates and returns to block 880 of FIG. 8.

Figure 10:
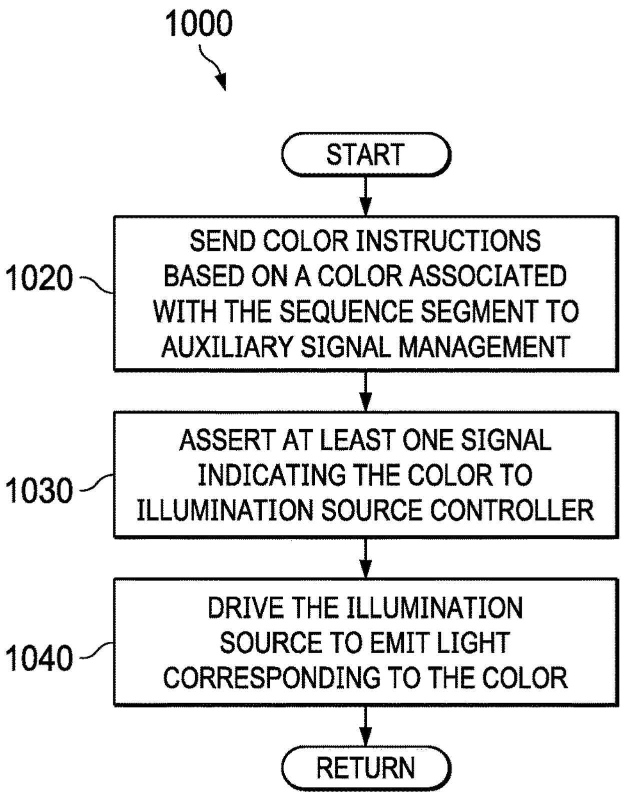
FIG. 10 is a flowchart representative of an example process.

FIG. 10 is a flowchart representative of an example process 1000 to drive the illumination source 140 based on a color defined in the sequence segment word. The example process 1000 is an example of block 860 described in connection to FIG. 8 and/or block 1305 described in connection to FIG. 13.

The example process 1000 of FIG. 10 begins at block 1020 when the execution engine 235 sends color instructions based on a color associated with the sequence segment to the auxiliary signal interface 220. For example, the color is defined in the sequence segment word. The execution engine 235 may send color auxiliary instructions in response to a color event from the auxiliary signal engine 250. For example, the color auxiliary instructions include an auxiliary bit to define the color.

At block 1030, the auxiliary signal interface 220 asserts at least one signal indicating the color to the illumination source controller 130. For example, the color corresponds to the sequence segment based on the color auxiliary instructions from the execution engine 235.

At block 1040, the illumination source controller 130 may drive the illumination source 140 to emit light corresponding to the color. For example, the light corresponding to the color is based on the at least one signal received from the auxiliary signal interface 220. The illumination source controller 130 may continue to drive the illumination source 140 until receiving a signal that indicates to stop emitting the light corresponding to the color.

The example process 1000 of FIG. 10 terminates and returns to block 880 of FIG. 8.

Figure 11:
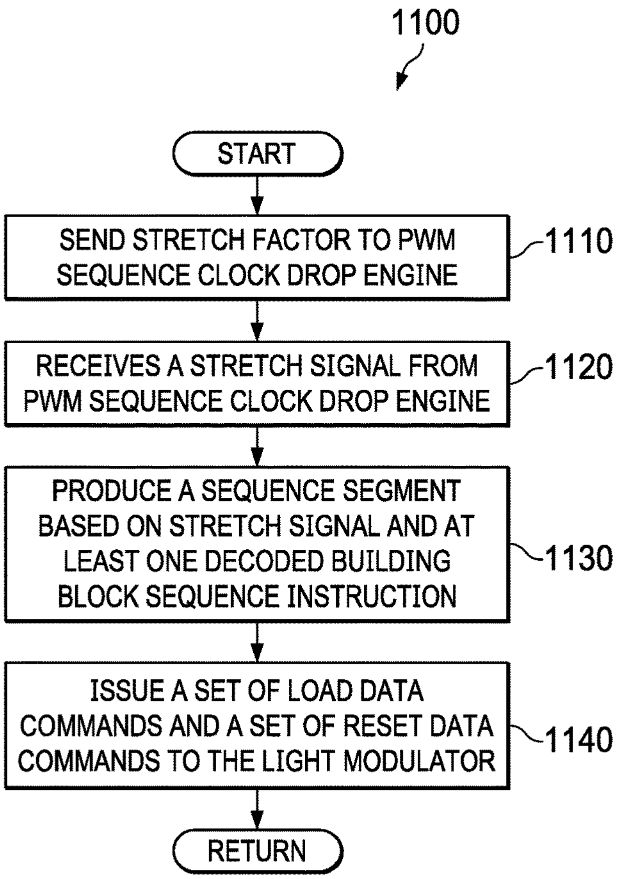
FIG. 11 is a flowchart representative of an example process.

FIG. 11 is a flowchart representative of an example process 1100 to issue a set of load data commands and a set of reset data commands. The example process 1100 is an example of block 870 described in connection with FIG. 8 and block 1310 described in connection with FIG. 13.

The example process 1100 of FIG. 11 begins at block 1110 when the execution engine 235 sends a stretch factor to the clock engine 245. The stretch factor may be defined in the sequence segment word. Additionally, the execution engine 235 may send the stretch factor and/or an event to apply the stretch factor based on an instruction from the auxiliary signal engine 250.

At block 1120, the execution engine 235 receives a stretch signal from the clock engine 245.

At block 1130, the execution engine 235 produces a sequence segment based on the stretch signal and at least one processed building block sequence instruction.

At block 1140, the execution engine 235 issues a set of load data commands and a set of reset data commands to the light modulator 150 via the display interface 225.

The example process 1100 of FIG. 11 terminates and returns to block 880 of FIG. 8.

Figure 12:
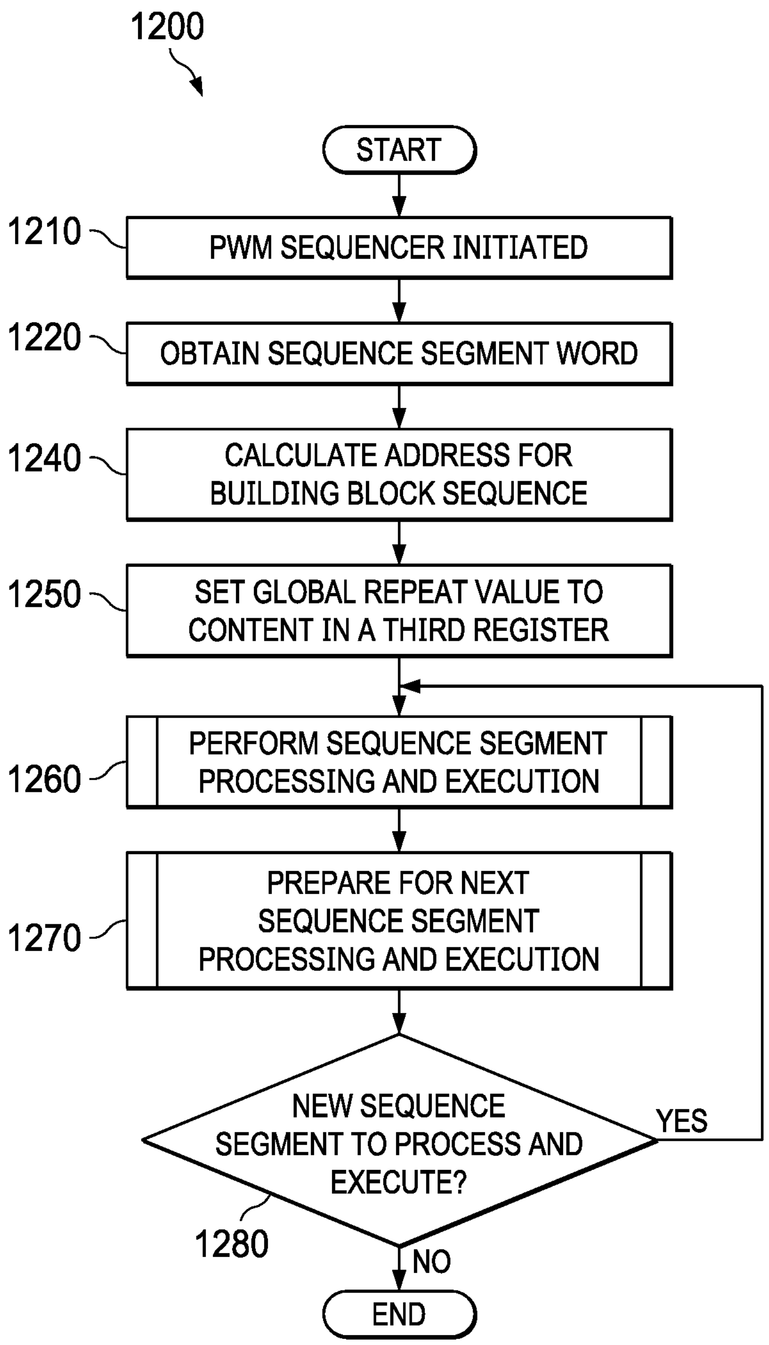
FIG. 12 is a flowchart representative of an example process.

FIG. 12 is a flowchart representative of an example process 1200 that may be performed using machine-readable instructions that may be executed by a processor and/or hardware configured to implement the digital controller 110 of FIG. 1 and/or the display system 100 of FIG. 1 to implement a second sequence processing and execution technique. The second sequence processing and execution technique is hardware-driven, utilizing the components shown in FIG. 5.

The example process 1200 of FIG. 12 begins at block 1210, at which the PWM sequencer 205 is initiated. For example, the PWM sequencer 205 is initiated in response to the digital controller 110 obtaining an input video, such as the input video 215 described in connection to FIG. 2. The input video may be obtained from an input device.

At block 1220, the execution engine 235 obtains a sequence segment word. The sequence segment word corresponds to a sequence segment entry in the execution memory 230. For example, the sequence segment entry is associated with an index equal to a value in a first register. The first register may indicate the start index corresponding to the execution memory 230. The sequence segment word may include a building block index, a sequence segment repeat value, a stretch factor, and/or a color.

At block 1240, the execution engine 235 calculates the address for a building block sequence. The building block sequence address is calculated based on the captured building block index from block 1230.

At block 1250, the PWM sequence repeat management engine 540 sets the global repeat value to a value from a third register. The third register may indicate the total times to process and execute a PWM sequence included in the execution memory 230.

At block 1260, the display system 100 performs sequence segment processing and execution. The sequence segment processing and execution drives the illumination source 140 to emit light and issues a set of reset data commands and load data commands to configure the light modulator 150. Details to perform sequence segment processing and execution are disclosed in connection to FIG. 13.

At block 1270, the display system 100 prepares for the next sequence segment processing and execution. Details to prepare for the next sequence segment processing and execution are disclosed in connection to FIGS. 14 and 15.

At block 1280, the display system 100 determines whether there is a new sequence segment to process and execute. If the display system 100 determines there is a new sequence segment to process and execute (e.g., block 1280 returns a result of "YES"), the display system 100 returns to block 1260. If the display system 100 determines there is not a new sequence segment to process (e.g., block 1280 returns a result of "NO"), the example process 1200 of FIG. 12 terminates.

Figure 13:
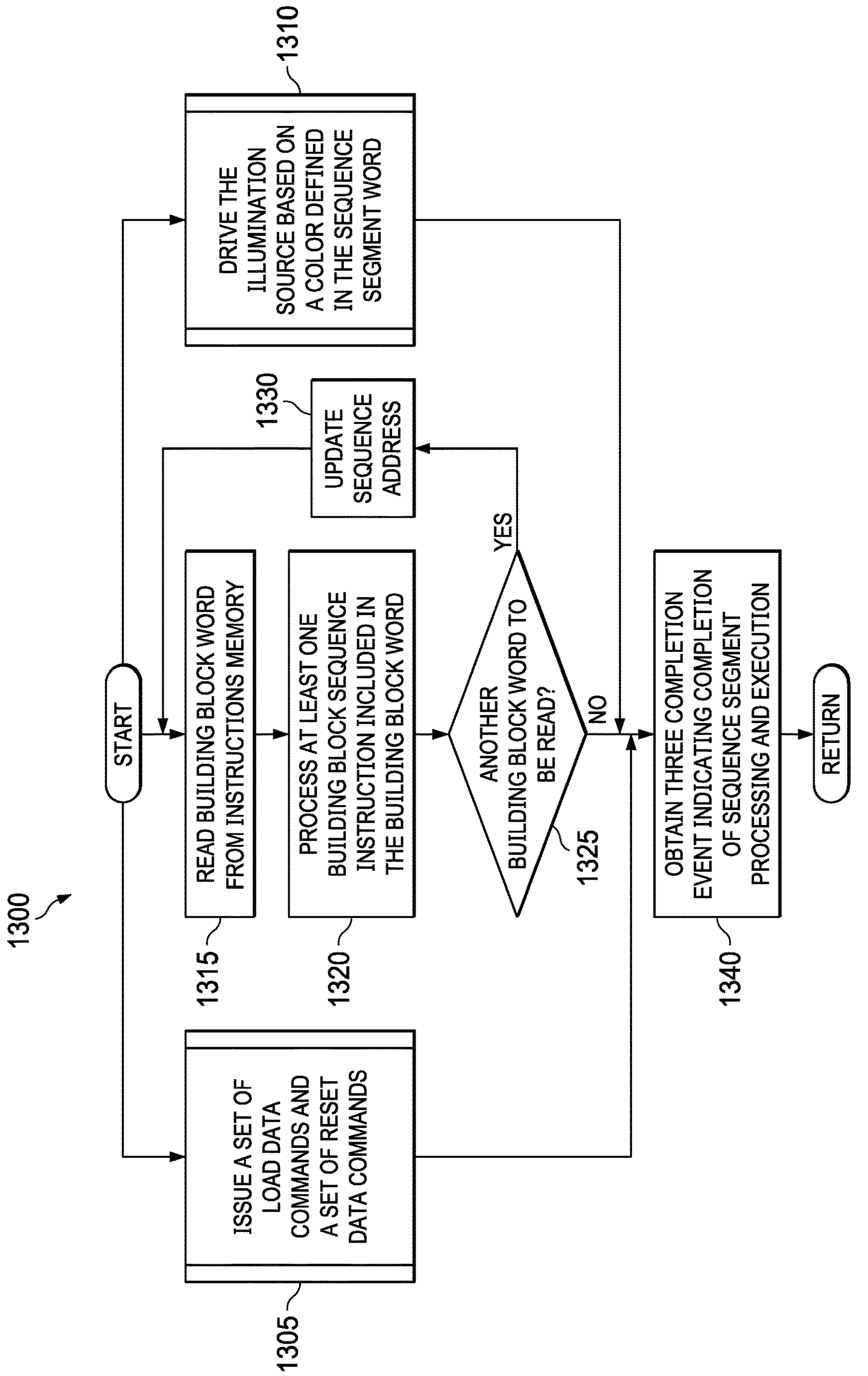
FIG. 13 is a flowchart representative of an example process.

FIG. 13 is a flowchart representative of an example process 1300 to perform sequence segment processing and execution. The example process 1300 is an example of block 1260 described in connection with FIG. 12.

At block 1305, the digital controller 110 executes the sequence segment by driving the illumination source 140 to emit light of a color based on a color defined in the sequence segment word.

At block 1310, the digital controller 110 executes the sequence segment by issuing a set of load data commands and a set of reset data commands to the light modulator 150 of FIG. 1.

At block 1315, the execution engine 235 reads a building block word from the instructions memory 240. For example, the building block word is associated with the building block index defined in the sequence segment word.

At block 1320, the execution engine 235 processes the at least one building block sequence instruction included in the building block word. For example, decoding the building block sequence produces auxiliary instructions for the auxiliary signal engine 250.

At block 1325, the execution engine 235 determines whether there is another building block word. For example, a sequence address indicates whether another building block word is to be read.

If the execution engine 235 determines there is another building block word is to be read (e.g., block 1325 returns a result of "YES"), the execution engine 235 continues to block 1330. For example, the sequence address indicates another building block word corresponds to the building block sequence associated with the sequence segment. Therefore, at least one additional building block sequence instruction is to be processed for the building block sequence processing.

At block 1330, the execution engine 235 updates the sequence address. The sequence address may be updated to correspond to the next building block word to be read. For example, the sequence address is incremented by 1. The execution engine 235 returns to block 1315.

If the execution engine 235 determines there is not another building block word (e.g., block 1325 returns a result of "NO"), the execution engine 235 continues to block 1340. The stretching of the building block sequence may occur in parallel while processing the building block sequence. Therefore, the sequence segment may be executed or partially executed by the end of decoding the at least one building block sequence instructions.

At block 1340, the execution engine 235 obtains three completion events to indicating completion of sequence segment processing and execution. These three completion events correspond to completion of the processes of block 1305, block 1310, and block 1325. Alternatively, the execution engine 235 may obtain any other event that the sequence processing and execution has been completed.

The example process 1300 of FIG. 13 terminates and returns to block 1270 of FIG. 12.

Figure 14:
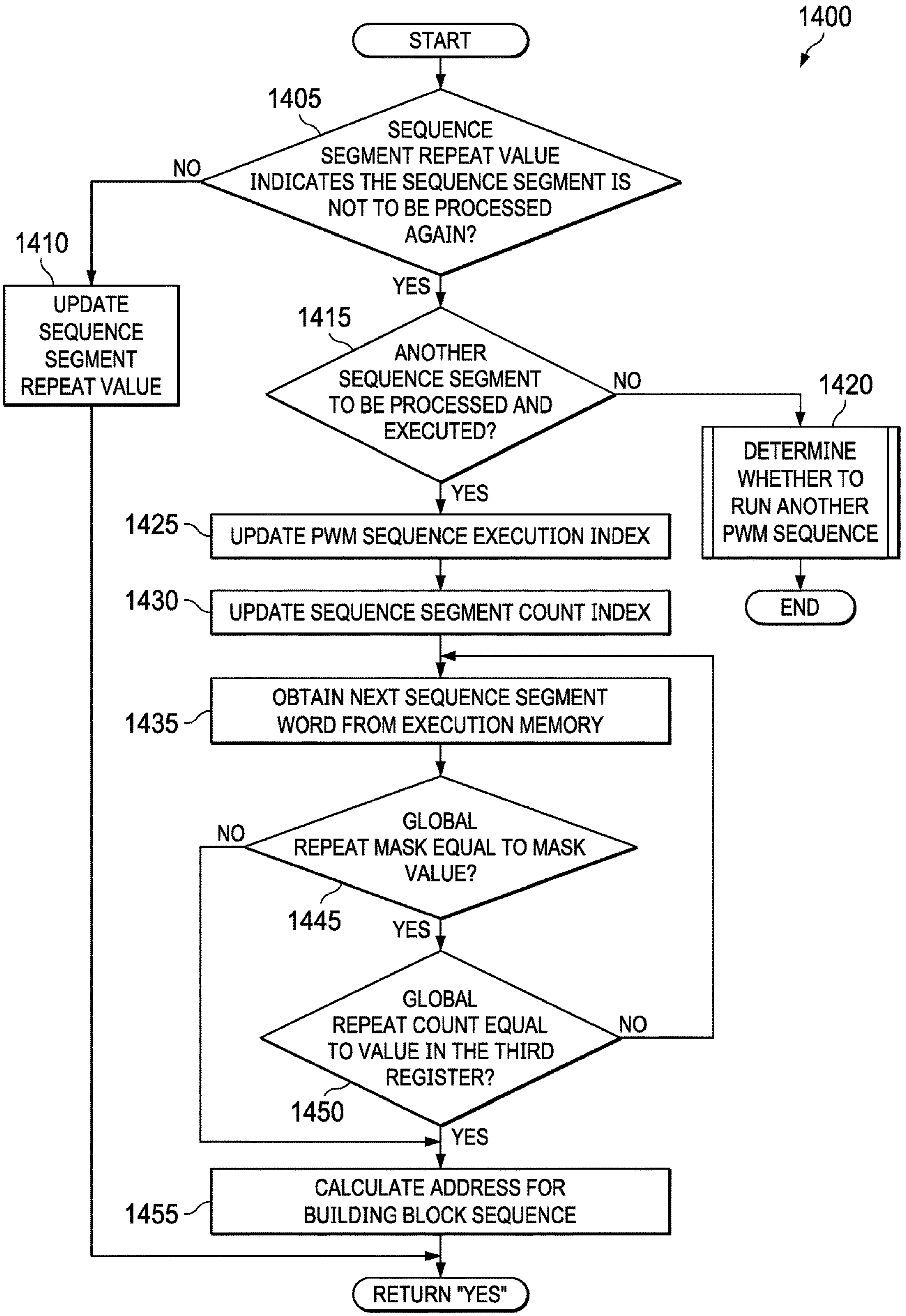
FIG. 14 is a flowchart representative of an example process.

FIG. 14 is a flowchart representative of an example process 1400 to prepare for the next sequence segment processing and execution. The example process 1400 is an example of block 1270 described in connection with FIG. 12.

At block 1405, the entry repeat management engine 520 determines whether the sequence segment repeat value indicates the sequence segment is not to be processed and executed again. For example, the sequence segment repeat value is zero or another predetermined value.

At block 1410, when the entry repeat management engine 520 determines the sequence segment repeat value indicates that the sequence segment is to be processed and executed again (e.g., block 1405 returns a result of "NO"), the entry repeat management engine 520 may update the sequence segment repeat value. For example, the sequence segment repeat value is decremented by one.

At block 1415, if the entry repeat management engine 520 determines the sequence segment repeat value indicates the sequence segment is not to be processed and executed again (e.g., block 1405 returns a result of "YES"), the execution engine 235 determines whether there is another sequence segment to be processed and executed to produce the PWM sequence. For example, determining if there is another sequence segment to be processed and executed is performed based on whether the sequence segment count index is equal to the value in a second register minus 1. The second register may include the number of sequence segments to be executed for the PWM sequence.

At block 1420, when the execution engine 235 determines there is not another sequence segment to be processed and executed to produce the PWM sequence (e.g., block 1415 returns a result of "NO"), the display system 100 determines whether to run another PWM sequence. Details are disclosed in connection to FIG. 15.

At block 1425, if the execution engine 235 determines there is another sequence segment to be processed and executed to produce the PWM sequence (e.g., block 1415 returns a result of "YES"), the PWM sequence repeat management engine 540 updates the PWM sequence execution index. For example, PWM sequence execution index is incremented by one.

At block 1430, the execution engine 235 updates the sequence segment count index. For example, the sequence segment count index is incremented by one.

At block 1435, the execution engine 235 obtains a next sequence segment word from the execution memory 230. For example, the next sequence segment word corresponds to the value in a first register plus the sequence segment count index. The next sequence segment word may include a building block index, a sequence segment repeat value, a stretch factor, a color, and/or a global repeat mask.

At block 1445, the PWM sequence repeat management engine 540 determines whether the global repeat mask is equal to a mask value. For example, the global repeat mask is equal to one. Alternatively, the PWM sequence repeat management engine 540 determines whether the sequence segment word is not to be processed and executed any other indication.

If the PWM sequence repeat management engine 540 determines the global repeat mask is not equal to the mask value (e.g., block 1445 returns a result of "NO"), the process continues to block 1455.

At block 1450, if the PWM sequence repeat management engine 540 determines the global repeat mask is equal to the mask value (e.g., block 1445 returns a result of "YES"), the PWM sequence repeat management engine 540 determines whether the global repeat count is equal to the value in the third register. The third register indicates how many times the execution memory 230 should be processed and executed. The global repeat count indicates the number of times the execution memory 230 has been processed and executed during the process.

If the PWM sequence repeat management engine 540 determines the global repeat count is not equal to the value in the third register (e.g., block 1450 returns a result of "NO"), the execution engine 235 returns to block 1435 and reads a next word from the execution memory 230.

If the PWM sequence repeat management engine 540 determines the global repeat count is equal to the value in the third register (e.g., block 1450 returns a result of "YES"), the process continues to block 1455.

At block 1455, the execution engine 235 calculates the address for a building block sequence. The building block sequence address is determined based on the captured building block index at block 1440. The example process 1400 of FIG. 14 terminates and returns to block 1280 of FIG. 12 indicating a new sequence is to be processed (e.g., returns "YES").

Figure 15:
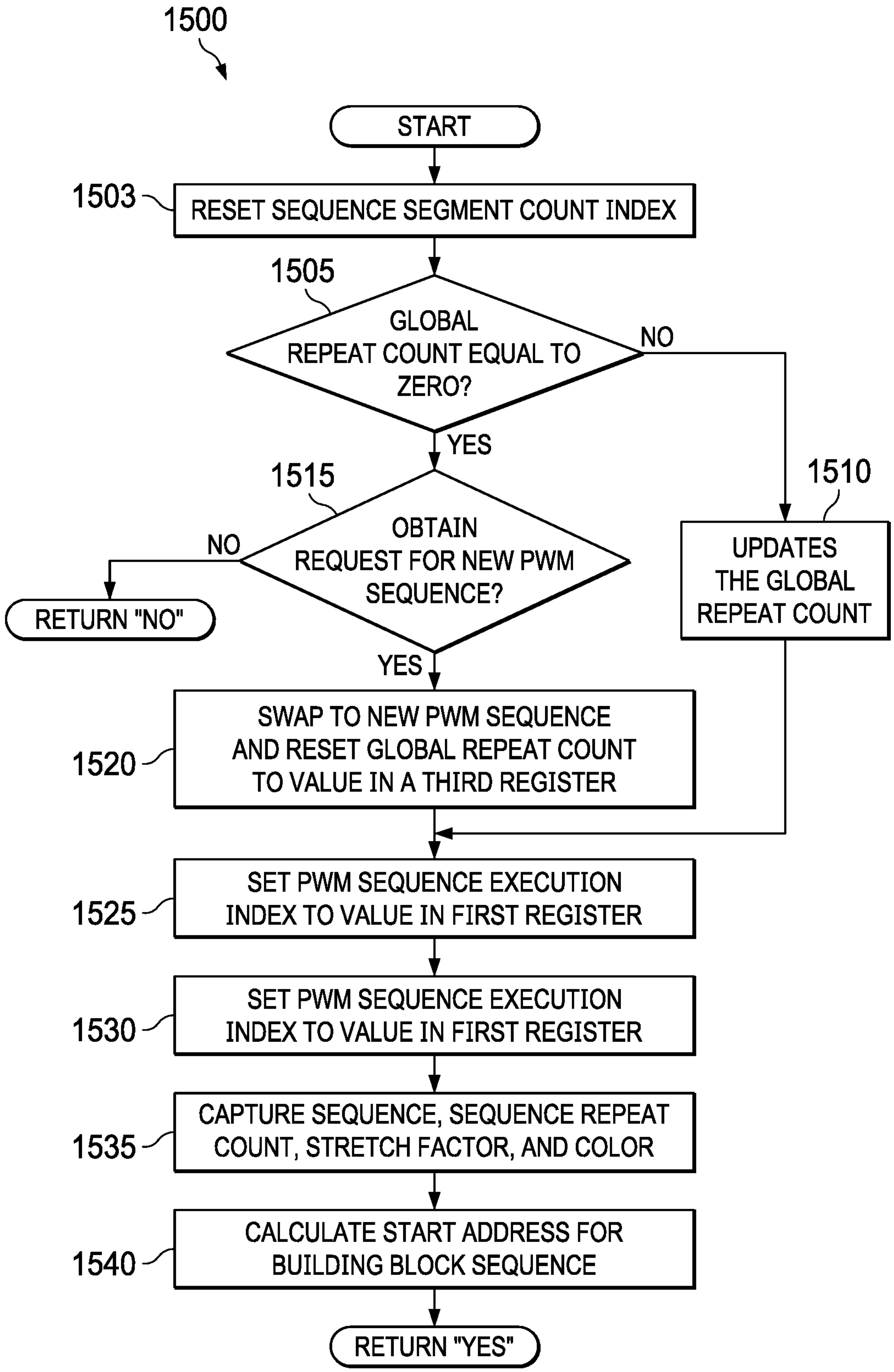
FIG. 15 is a flowchart representative of an example process.

FIG. 15 is a flowchart representative of an example process 1500 to determine whether to run another PWM sequence. The example process 1500 is an example of block 1420 described in connection with FIG. 14.

At block 1503, the execution engine 235 resets the sequence segment count index. For example, the sequence segment count index may be set to zero.

At block 1505, the PWM sequence repeat management engine 540 determines whether the global repeat count is equal to zero.

At block 1510, if the PWM sequence repeat management engine 540 determines the global repeat count is not equal to zero (e.g., block 1505 returns a result of "NO"), the PWM sequence repeat management engine 540 updates the global repeat count. For example, the global repeat count is decremented by one.

At block 1515, if the PWM sequence repeat management engine 540 determines the global repeat count is equal to zero (e.g., block 1505 returns a result of "YES"), the PWM sequence repeat management engine 540 determines whether a request has been obtained for a new PWM sequence.

If the PWM sequence repeat management engine 540 determines a request has not been obtained for the new PWM sequence (e.g., block 1515 returns a result of "NO"), the example process 1420 of FIG. 14 terminates and returns to block 1280 of FIG. 12 indicating a new sequence is not to be processed and executed (e.g., returns "NO").

If the PWM sequence repeat management engine 540 determines a request has been obtained for the new PWM sequence (e.g., block 1515 returns a result of "YES"), the PWM sequence repeat management engine 540 swaps to the new PWM sequence and resets the global repeat count to value in the third register at block 1520. The third register may be associated with the new PWM sequence. For example, the new PWM sequence is stored in a new lookup table included in the execution memory 230.

At block 1525, the PWM sequence repeat management engine 540 sets the PWM sequence execution index to a value in the first register.

At block 1530, execution engine 235 reads a sequence segment word. The sequence segment word corresponds to a sequence segment entry in the execution memory 230. For example, the sequence segment entry is associated with an index equal to a value in a first register. The first register may indicate the start index corresponding to the execution memory 230.

At block 1535, the execution engine 235 captures the captures the building block index, sequence segment repeat value, stretch factor, and color. The information is captured based on the sequence segment word.

At block 1540, the execution engine 235 calculates the address for a building block sequence. The building block sequence address is determined based on the captured building block index. The example process 1500 of FIG. 15 terminates and returns to block 1280 of FIG. 12 indicating a new sequence is to be processed (e.g., returns "YES").

Figure 16:
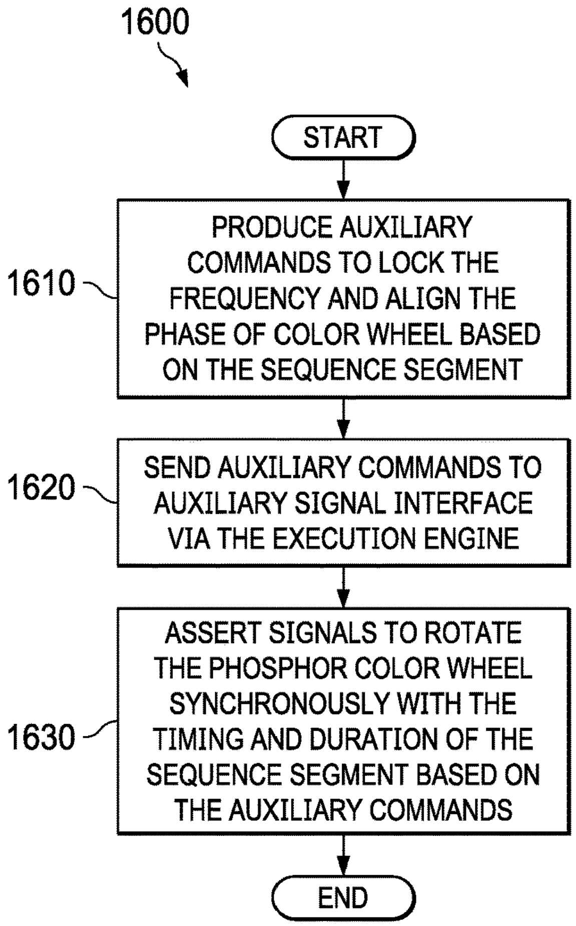
FIG. 16 is a flowchart representative of an example process.

FIG. 16 is a flowchart representative of an example process 1600 to control a color wheel.

At block 1610, the auxiliary signal engine 250 produces auxiliary commands to lock the frequency and align the phase of the color wheel based on the sequence segment. The auxiliary signal engine 250 may be programmed to produce the auxiliary commands. In some examples, the color wheel is a phosphor color wheel included in the illumination source 140.

At block 1620, the auxiliary signal engine 250 sends the auxiliary commands to the auxiliary signal interface 220 via the execution engine 235.

At block 1630, the auxiliary signal interface 220 asserts signals to rotate the phosphor color synchronously with the timing and duration of the sequence segment based on the auxiliary commands. The example process 1600 of FIG. 16 terminates.

Figure 17:
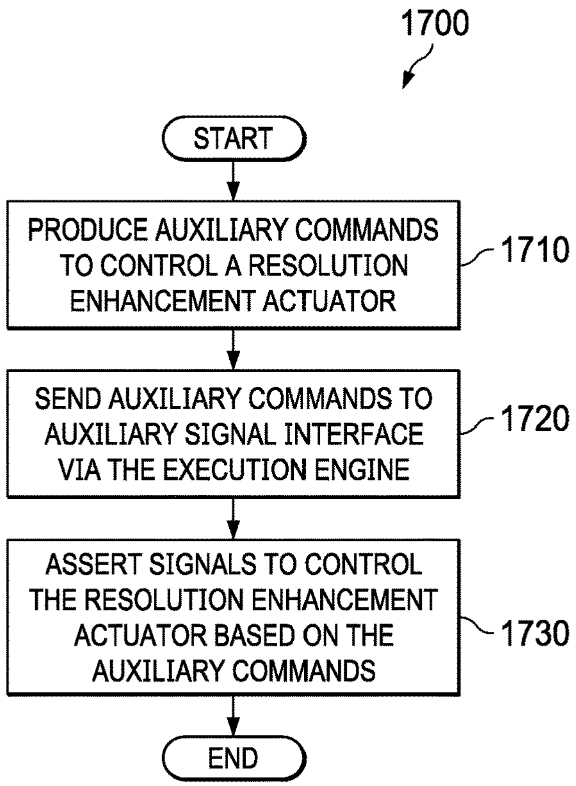
FIG. 17 is a flowchart representative of an example process.

FIG. 17 is a flowchart representative of an example process 1700 to control a resolution enhancement actuator.

At block 1710, the auxiliary signal engine 250 produces auxiliary commands to control a resolution enhancement actuator. The auxiliary signal engine 250 may be programmed to produce the auxiliary commands. In one example, auxiliary commands indicate to activate or deactivate the resolution enhancement actuator. In some examples, the resolution enhancement actuator includes a glass window glass to direct light received from the light modulator 150. The resolution enhancement actuator may tilt the glass window to shift the light corresponding to pixels from the light modulator 150, for example by half a pixel in each direction.

At block 1720, the auxiliary signal engine 250 sends auxiliary commands to the auxiliary signal interface 220 via the execution engine 235.

At block 1730, the auxiliary signal interface 220 asserts signals to control the resolution enhancement actuator based on the auxiliary commands. The example process 1700 of FIG. 17 terminates.

From the foregoing, it will be appreciated that methods, apparatus and articles of manufacture have been disclosed that implement a PWM sequencer to produce sequence segments to build a PWM sequence. The sequence segments are produced by building block sequences, which may be stretched to match the color segments of the PWM sequence. Additionally, the color to drive an illumination source may be defined by the sequence segment based on the color segment of the PWM sequence. The sequence segments are in an order to be processed and executed to control the illumination source and a light modulator. Additionally, the PWM sequencer may create other signals independently from the sequence segments. The disclosed methods, apparatus and articles of manufacture improve the efficiency of using a computing device by producing sequence segments to build a PWM sequence, which eliminates the need for producing the entire PWM sequence. The disclosed methods, apparatus and articles of manufacture are accordingly directed to one or more improvement(s) in the functioning of a computer.

What is claimed is:

1. A controller configured to:

obtain a sequence segment index;

based on the sequence segment index, determining a building block index, a stretch factor, and a color, wherein the building block index includes a parameter different from each of at least one parameter in the sequence segment index;

obtain a building block sequence based on the building block index;

produce a sequence segment of a pulse width modulation (PWM) sequence by stretching the building block sequence by the stretch factor and assigning the color to the sequence segment; and instruct a light modulator to set pixel elements according to one of a plurality of display modes based on the PWM sequence, wherein the light modulator comprises the pixel elements.

2. The controller of claim 1, wherein the controller is a first controller, the first controller coupled to a second controller, wherein the first controller is configured to instruct the second controller to drive an illumination source to emit light based on a color associated with the sequence segment.

3. The controller of claim 1, wherein the sequence segment is a first sequence segment and the PWM sequence is a first PWM sequence, wherein the controller is configured to:

in response to producing the first sequence segment, execute first instructions to produce a second sequence segment for first pulse-width modulation (PWM) sequence, wherein the first PWM sequence comprises the first sequence segment and the second sequence segment;

in response to receiving a request for a second PWM sequence during run-time, execute second instructions to produce a third sequence segment for the second PWM sequence, wherein the second PWM sequence comprises the third sequence segment and a fourth sequence segment; and in response to completion of the second instructions, execute third instructions to produce the fourth sequence segment for the second PWM sequence.

4. The controller of claim 3, wherein the building block sequence is a first building block sequence, the stretch factor is a first stretch factor, and the color is a first color, the controller is coupled to at least one memory, the controller configured to store in the at least one memory:

the first building block sequence, the first stretch factor, and the first color associated with the first sequence segment;

a second building block sequence, a second stretch factor, and a second color associated with the second sequence segment;

the first PWM sequence including the first sequence segment and the second sequence segment;

a third building block sequence, a third stretch factor, and a third color associated with the third sequence segment;

a fourth building block sequence, a fourth stretch factor, and a fourth color associated with the fourth sequence segment;

the second PWM sequence including the third sequence segment and the fourth sequence segment; and building block sequence instructions corresponding to the first building block sequence, the second building block sequence, the third building block sequence, and the fourth building block sequence.

5. The controller of claim 3, wherein the controller is configured to obtain the request for the second PWM sequence based on the controller receiving input video comprising video content or presentation content, a temperature of a light source, or ambient light conditions surrounding a display.

6. The controller of claim 1, wherein the controller is configured to select:

the building block sequence corresponding to a first building block sequence of building block sequences based on a first time duration associated with a color segment corresponding to the sequence segment;

the stretch factor to stretch a second time duration associated with the first building block sequence to match the first time duration; and the color for the sequence segment.

7. The controller of claim 1, wherein the controller is configured to produce the sequence segment based on:

a frame rate; or a duty cycle to define color temperature, the duty cycle being a ratio of a first time duration associated with a first color, a second time duration associated with a second color, or a third time duration associated with a third color.

8. The controller of claim 1, wherein the controller is configured to produce signals configured to control a phosphor color wheel or a resolution enhancement actuator independently from producing the sequence segment.

9. A system comprising:

a light modulator comprising pixel elements; and a controller coupled to the light modulator, the controller configured to:

obtain a sequence segment index;

based on the sequence segment index, determining a building block index; a stretch factor, and a color, wherein the building block index includes a parameter different from each of at least one parameter in the sequence segment index;

obtain a building block sequence based on the building block index; and produce a sequence segment of a pulse width modulation (PWM) sequence by stretching the building block sequence by the stretch factor and assigning the color to the sequence segment; and wherein the light modulator is configured to set the pixel elements according to one of a plurality of display modes based on the PWM sequence.

10. The system of claim 9, wherein the controller is a first controller, the system further comprising:

an illumination source optically coupled to the light modulator; and a second controller coupled to the first controller and to the illumination source, the second controller configured to drive the illumination source to emit light to the light modulator.

11. The system of claim 10, wherein the light modulator further comprises memory cells, wherein the memory cells are associated with the pixel elements, the second controller configured to:

produce load data commands; and produce reset data commands, and wherein the light modulator configured to:

load data to the memory cells based on the load data commands; and configure the pixel elements based on the data in the memory cells in response to receiving the reset data commands.

12. The system of claim 9, further comprising a resolution enhancement actuator coupled to the controller, the controller configured to produce signals to control the resolution enhancement actuator independently from producing the sequence segment.

13. The system of claim 9, further comprising a phosphor color wheel coupled to the controller, the controller configured to produce signals to control the phosphor color wheel independently from producing the sequence segment.

14. A method comprising:

obtaining, by a controller, a sequence segment index;

based on the sequence segment index, determining, by the controller, a building block index, a first stretch factor, and a first color, wherein the building block index includes a parameter different from each of at least one parameter in the sequence segment index;

obtaining, by the controller a first building block sequence based on the building block index;

producing, by the controller a first sequence segment of a pulse width modulation (PWM) sequence by stretching the first building block sequence by the first stretch factor;

configuring pixel elements based on the first sequence segment;

producing, by the controller a second sequence segment of the PWM sequence having a third time duration by stretching a second building block sequence having a fourth time duration by a second stretch factor; and configuring the pixel elements according to one of a plurality of display modes based on the second sequence segment.

15. The method of claim 14, further comprising driving an illumination source to emit light based on a first color associated with the first sequence segment for a first time duration, and to emit light based on a second color associated with the second sequence segment for a second time duration.

16. The method of claim 14, further comprising producing signals to control a phosphor color wheel or a resolution enhancement actuator independently from the producing the first sequence segment and the second sequence segment.

17. The method of claim 14, further comprising calculating a first address for the first building block sequence including first building block sequence instructions, and calculating a second address for the second building block sequence including second building block sequence instructions.

18. The method of claim 17, further comprising processing the first building block sequence instructions associated with the first building block sequence, and processing the second building block sequence instructions associated with the second building block sequence.

19. The method of claim 14, further comprising producing a first stretch signal based on the first stretch factor associated with the first sequence segment in response to a first stretch event received by a clock engine, wherein the first stretch signal is utilized to stretch the first building block sequence, and producing a second stretch signal based on the second stretch factor associated with the second sequence segment in response to a second stretch event received by the clock engine, wherein the second stretch signal is utilized to stretch the second building block sequence.

20. The method of claim 14, wherein the PWM sequence is a first PWM sequence, the method further comprising producing a third sequence segment associated with a second PWM sequence in response to receiving a request for the second PWM sequence during run-time.

* * * * *